US010628036B2

(12) United States Patent
Paek et al.

(10) Patent No.: US 10,628,036 B2
(45) Date of Patent: Apr. 21, 2020

(54) KEYBOARD CUSTOMIZATION

(71) Applicant: Microsoft Technology Licensing, LLC, Redmond, WA (US)

(72) Inventors: Timothy S. Paek, Sammamish, WA (US); Dmitry Rudchenko, Redmond, WA (US); Zach Oligschlaeger, Redmond, WA (US); Asela J. Gunawardana, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 151 days.

(21) Appl. No.: 15/215,115

(22) Filed: Jul. 20, 2016

(65) Prior Publication Data

US 2017/0205992 A1 Jul. 20, 2017

Related U.S. Application Data

(60) Provisional application No. 62/280,105, filed on Jan. 18, 2016.

(51) Int. Cl.
*G06F 3/0488* (2013.01)
*G06T 7/90* (2017.01)
(Continued)

(52) U.S. Cl.
CPC ........ *G06F 3/04886* (2013.01); *G06F 3/0482* (2013.01); *G06F 3/0485* (2013.01);
(Continued)

(58) Field of Classification Search
CPC .... G06F 3/04886; G06F 3/0488; G06F 3/048; G06F 3/04883; G06F 3/04817;
(Continued)

(56) References Cited

U.S. PATENT DOCUMENTS 5,745,109 A 4/1998 Nakano et al.
9,013,423 B2 4/2015 Ferren
(Continued)

FOREIGN PATENT DOCUMENTS

| CN | 101894534 | 11/2010 |
| CN | 102362254 | 2/2012 |
| WO | WO2012155776 | 11/2012 |

OTHER PUBLICATIONS

Melanie Pinola, "How to Make Your Own Windows 10 Theme", Aug. 27, 2015, Laptopmag.com URL:https://www.laptopmag.com/articles/make-windows-10-theme.*

(Continued)

*Primary Examiner* — Justin R. Blaufeld
(74) *Attorney, Agent, or Firm* — Faegre Drinker Biddle & Reath LLP

(57) ABSTRACT

Techniques are provided for customizing a design of a soft input panel. An electronic device can provide a keyboard customization interface to enable a user to specify a color, font, background image, and the like for the soft input panel. The user may provide input through the keyboard customization interface to customize the design (e.g., theme) of the soft input panel. The user may provide an image to be used as a background for the soft input panel. The electronic device can analyze the image to determine a most prominent color of the image. A portion of the soft input panel can be set to a color that is based on the most prominent color of the image.

20 Claims, 21 Drawing Sheets

(51) Int. Cl.
*G06F 3/0481* (2013.01)
*G06F 3/0484* (2013.01)
*G06F 3/0485* (2013.01)
*G06F 3/0482* (2013.01)

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04847* (2013.01); *G06T 7/90* (2017.01)

(58) Field of Classification Search
CPC .. G06F 3/0482; G06F 3/04845; G06F 3/0485; G06T 7/90
See application file for complete search history.

(56) References Cited

U.S. PATENT DOCUMENTS

| | | | |
|---|---|---|---|
| 9,329,777 B2* | 5/2016 | Chung | G06F 3/04886 |
| 9,547,375 B2 | 1/2017 | Paek et al. | |
| 9,740,399 B2 | 8/2017 | Paek et al. | |
| 9,851,897 B2 | 12/2017 | Ferren | |
| 2003/0095107 A1 | 5/2003 | Griffin et al. | |
| 2006/0085757 A1 | 4/2006 | Andre et al. | |
| 2008/0168075 A1 | 7/2008 | Kamiyabu | |
| 2009/0058823 A1 | 3/2009 | Kocienda | |
| 2010/0241985 A1* | 9/2010 | Kim | G06F 3/04886 |
| | | | 715/773 |
| 2011/0090151 A1 | 4/2011 | Huang et al. | |
| 2011/0202839 A1* | 8/2011 | AlKazi | G06F 3/0233 |
| | | | 715/703 |
| 2012/0062465 A1 | 3/2012 | Spetalnick | |
| 2012/0075194 A1 | 3/2012 | Ferren | |
| 2012/0113007 A1 | 5/2012 | Koch et al. | |
| 2012/0162078 A1 | 6/2012 | Ferren et al. | |
| 2012/0306743 A1* | 12/2012 | Klassen | G06T 11/001 |
| | | | 345/156 |
| 2013/0159919 A1 | 6/2013 | Leydon | |
| 2013/0234949 A1* | 9/2013 | Chornenky | G06F 3/0216 |
| | | | 345/169 |
| 2013/0241838 A1* | 9/2013 | Onishi | G06F 3/0236 |
| | | | 345/169 |
| 2013/0307783 A1* | 11/2013 | Park | G06F 3/04886 |
| | | | 345/169 |
| 2014/0082546 A1 | 3/2014 | Yang | |
| 2014/0098024 A1 | 4/2014 | Paek et al. | |
| 2014/0098036 A1 | 4/2014 | Paek et al. | |
| 2014/0101545 A1 | 4/2014 | Paek et al. | |
| 2014/0101593 A1* | 4/2014 | Paek | G06F 3/023 |
| | | | 715/773 |
| 2014/0247221 A1 | 9/2014 | Ferren | |
| 2015/0067572 A1 | 3/2015 | Bai | |
| 2015/0149939 A1* | 5/2015 | Mayblum | H04M 1/72544 |
| | | | 715/765 |
| 2015/0205522 A1* | 7/2015 | Zeng | G06F 3/04886 |
| | | | 715/847 |
| 2015/0286372 A1* | 10/2015 | Swindell | G06F 3/0481 |
| | | | 715/762 |
| 2015/0293659 A1* | 10/2015 | Yoo | G06F 3/04817 |
| | | | 715/765 |
| 2016/0070466 A1* | 3/2016 | Chaudhri | G06F 3/0484 |
| | | | 715/765 |
| 2016/0103608 A1* | 4/2016 | Nukala | G06F 17/211 |
| | | | 345/419 |
| 2016/0132205 A1 | 5/2016 | Ramakrishnan et al. | |
| 2017/0052702 A1* | 2/2017 | Norris, III | G06F 3/04886 |
| 2017/0090751 A1 | 3/2017 | Paek et al. | |
| 2017/0206003 A1 | 7/2017 | Paek et al. | |

OTHER PUBLICATIONS

Jeff Benjamin, "How to easily change the color of your iPhone keyboard", Feb. 24, 2014, ColorYourBoard Mobile Application URL: http://www.idownloadblog.com/2014/02/24/colory0urboard/.*
"Custom Keyboard—Free Customize Color Keyboards Skins & Backgrounds", Retrieved on: Jan. 22, 2016; Available at: https://itunes.apple.com/in/app/custom-keyboard-free-customize/id922822496?mt=8; 3 pages.
Freundt, Jan-Niklas, "Photo Keyboard—Custom Background Images for your Keyboard", Published on: Jan. 16, 2015; Available at: https://itunes.apple.com/us/app/photo-keyboard-custom-background/id956301107?mt=8; 2 pages.
"GO Keyboard—Emoji, Sticker", Retrieved on: Jan. 22, 2016; Available at: https://play.google.com/store/apps/details?id=com.jb.emoji.gokeyboard&hl=en; 4 pages.
"Go Keyboard 7 Theme", Retrieved on: Jan. 22, 2016, Available at: http://m.exodius.store.aptoide.com/app/market/com.jb.gokeyboard.theme.theme7/2/5220277/Go+Keyboard+7+Theme; 2 pages.
"How to Use Emojis on Windows 10", Published on: Aug. 14, 2015 Available at: http://blog.getemoji.com/emoji-keyboard-windows; 4 pages.
McElhearn, Kirk, "Secrets of the iOS 7 keyboard", Published on: Oct. 4, 2013 Available at: http://www.macworld.com/article/2050506/secrets-of-the-ios-7-keyboard.html; 4 pages.
"My Photo Keyboard", Published on: Dec. 16, 2015; Available at: https://play.google.com/store/apps/details?id=arrow.myphoto.keyboard&hl=en; 2 pages.
"On-Screen Virtual Keyboard with Customizable Layouts and Languages, a Number of Predefined Themes.", Published on: Oct. 10, 2013 Available at: http://fpscomponents.com/Products/WPF/virtual-keyboard-wpf.aspx; 7 pages.
Sinofsky, Steven, "Designing the Windows 8 Touch Keyboard", Published on: Jul. 17, 2012 Available at: https:// blogs.msdn.microsoft.com/b8/2012/07/17/designing-the-windows-8-touch-keyboard/, 37 pages.
"Non Final Office Action Issued in U.S. Appl. No. 15/215,028", dated Jun. 27, 2018, 17 Pages.
"International Search Report and Written Opinion Issued in PCT Application No. PCT/US2017/013571", dated Apr. 5, 2017, 16 Pages.
"Final Office Action Issued in U.S. Appl. No. 15/215,028", dated Jan. 23, 2019, 15 Pages.
"Non Final Office Action Issued in U.S. Appl. No. 15/215,028", dated Jun. 26, 2019, 18 Pages.
"Office Action Issued in European Patent Application No. 17704348.6", dated Nov. 25, 2019, 8 Pages.
"Final Office Action issued in U.S. Appl. No. 15/215,028", dated Dec. 10, 2019, 20 Pages.

* cited by examiner

KEYBOARD CUSTOMIZATION

RELATED APPLICATIONS

This application claims the benefit of and claims priority to U.S. Provisional Patent Application No. 62/280,105, filed Jan. 18, 2016, the entire contents of which are incorporated herein by reference.

BACKGROUND

Computing devices can include a touchscreen keyboard, such as a soft input panel (SIP), instead of a conventional physical keyboard for a user to enter text. Conventionally, touchscreen keyboards are designed for users to provide input using both hands. For instance, a touchscreen keyboard can include a horizontal keyboard located across a bottom portion of the display. However, in situations where the user only has a single hand available to utilize the keyboard or otherwise desires to use a single hand, the user may find it difficult to reach each key of the horizontal keyboard. For instance, a right-handed user may be unable to reach keys that are located at the left side of the display.

SUMMARY

Described herein are techniques and processes for providing an arc layout for a soft input panel. In some examples, an electronic device can transition from providing a substantially straight and/or horizontal layout for a soft input panel to an arc layout for the soft input panel. For instance, the electronic device can display, via a touch surface, the soft input panel using the substantially straight layout. The electronic device can further display a graphical element at a specific location of the soft input panel. While displaying the soft input panel, the electronic device can receive input associated with the graphical element. For instance, in some examples, the electronic device can receive input corresponding to a swipe of the graphical element in a curved manner across the soft input panel. Based on the input, the electronic device can transition from displaying the soft input panel using the substantially straight layout to displaying the soft input panel using the arc layout.

Additionally, described herein are techniques and processes for customizing a design of a soft input panel. For instance, an electronic device can provide a keyboard customization interface to enable a user to specify a color, font, background image, and so on for the soft input panel. The soft input panel can be configured to be transitioned to an arc layout. The user may provide input through the keyboard customization interface to customize the design (e.g., theme) of the soft input panel. In some instances, the user may provide an image to be used as a background for the soft input panel. The electronic device can analyze the image to determine a most prominent color of the image. A portion of the soft input panel can be set to a color that is based on the most prominent color of the image (e.g., set to the most prominent color, set to a color that is a particular percentage darker or lighter than the most prominent color, etc.).

BRIEF DESCRIPTION OF THE KEYBOARD

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
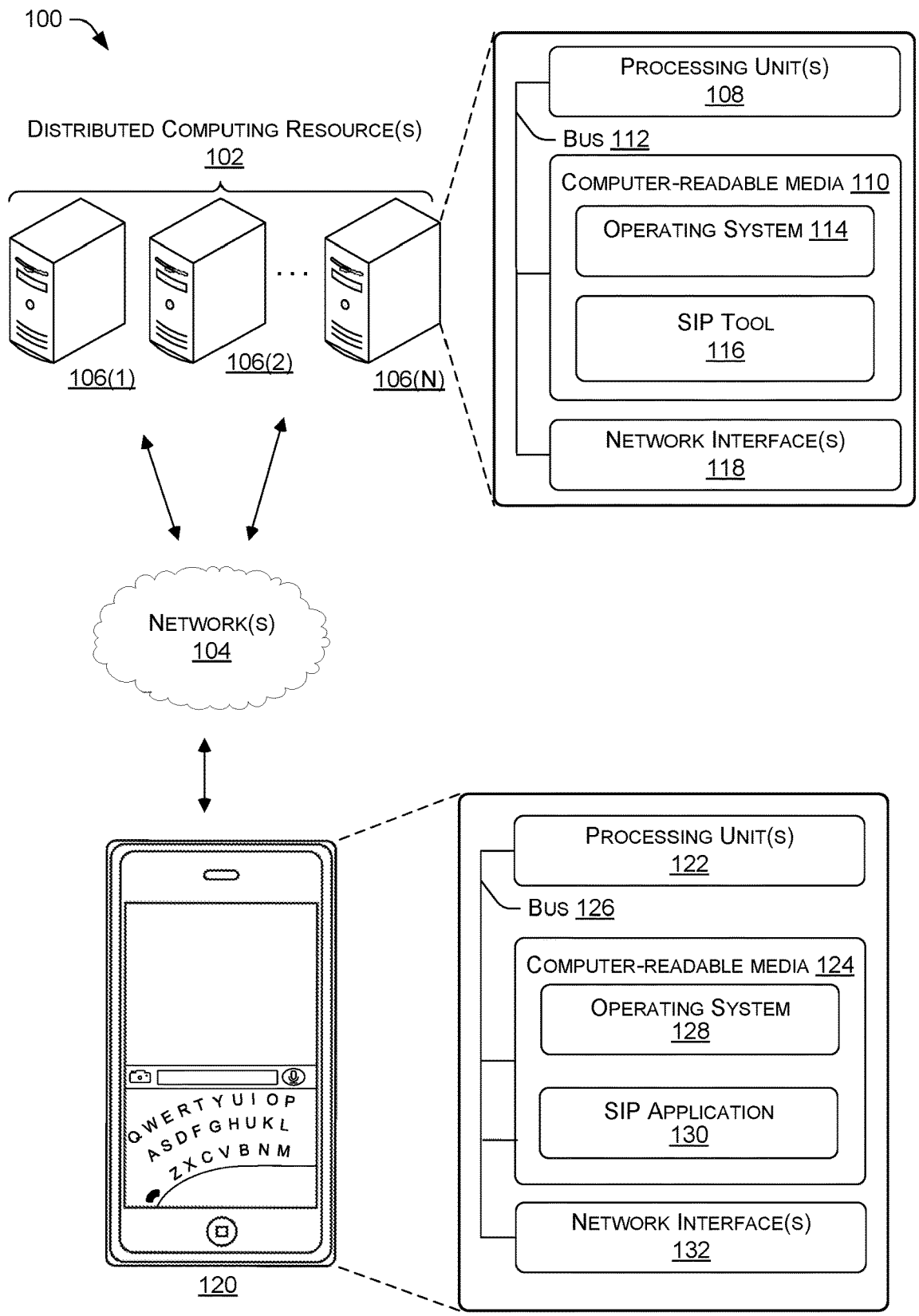
FIG. 1 is a block diagram depicting an example environment in which techniques herein may be implemented.

The techniques and constructs discussed herein are directed to an arc layout for a soft input panel (SIP). For instance, an electronic device, such as a mobile phone, can present an SIP for providing user interactions. In some examples, the SIP is an on-screen graphical representation for providing input for electronic devices that may not have a standard, physical keyboard. For instance, the SIP can include a digital representation of a QWERTY virtual keyboard that the user can use to input letters and/or other characters when using the electronic device. To use the SIP, the user can touch different regions on a touch screen of the electronic device that is presenting the SIP, where each region corresponds to a specific letter or other character.

In some examples, the electronic device may provide the SIP using a horizontal and/or substantially straight layout. The terms "horizontal" and/or "substantially straight" may refer to the orientation of the keys of the SIP (e.g., the keys are in one or more straight lines). For instance, the straight layout is often the default layout of the SIP. In a straight layout, the keys may be parallel with respect to each other and/or an edge of the touch-sensitive display.

In any event, while displaying the SIP in the straight layout, the electronic device can receive input to invoke (e.g., transform the keyboard into) an arc layout. The term "arc" may refer to the orientation of the keys of the SIP (e.g., the keys are positioned along a curved and/or slanted path). The input can include a swipe of a particular graphical element of the SIP in a curved manner. For example, if a user is holding a mobile device with a right hand (e.g., in a portrait orientation), the user can transition the SIP into an arc layout by swiping the user's thumb from the right side of the mobile device in an arced manner toward the left side of the mobile device. The user can also return the SIP to the straight layout by using a reverse motion (e.g., swiping from a left side of the device to a right side of the device in an arced manner along substantially the same path and/or any other arced path). In many instances, the arc layout of the SIP can allow the user to more effectively use an electronic device with one hand, such as in cases where a user is holding a mobile device with a right or left hand. Further, the arced manner of accessing the arc SIP can also allow the user to more effectively transition to or from the arc layout of the SIP.

The techniques and constructs discussed herein are also directed to customizing a design of an SIP. In some examples, an electronic device can provide an SIP customization interface to a user to customize various aspects of the SIP. As one example, the user can set a background of the SIP, set a color of a border around the background, set a color for the characters included in the SIP, set an audio sound to output when a key is contacted, and/or configure a variety of other design features to personalize the SIP. As another example, a user can select an image to be set as a background for the SIP. The electronic device can analyze the image to identify a color (e.g., a most prominent color) that is used in the image. Based on the analysis, the electronic device can set a color of a portion of the SIP (e.g., lighter and/or darker than the most prominent color of the image). In a further example, a user may select an SIP design that has been previously created by another user. The design may define a theme for the SIP, such as a color, font type, image, or the like.

In many instances, the techniques are discussed herein in the context of displaying an SIP while an electronic device is positioned in a portrait orientation. However, the techniques can additionally, or alternatively, be implemented in the context of the electronic device positioned in a landscape orientation. An example soft input panel is described in U.S. application Ser. No. 13/727,629, filed Dec. 27, 2012, titled "Arced or Slanted Soft Input Panels," the entire contents of which are incorporated herein by reference. However, other types of soft input panels may be used. The term "techniques" may refer to system(s), method(s), computer-readable instructions, module(s), algorithms, hardware logic, and/or operation(s) as permitted by the context described above and throughout the document.

Illustrative Environment

FIG. 1 shows an example environment 100 in which the techniques herein may be implemented. In some examples, the various devices and/or components of environment 100 include distributed computing resource(s) 102 that can communicate with one another and with external devices via one or more network(s) 104.

Network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth), or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like. In some examples, network(s) 104 can further include devices that enable connection to a wireless network, such as a wireless access point (WAP). For instance, support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resource(s) 102 include devices 106(1)-106(N). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as servers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, thin clients, terminals, work stations, integrated components for inclusion in a computing device, or any other sort of computing device.

Device(s) 106 can include any type of computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, an SIP tool 116, and other modules, programs, or applications that are loadable and executable by processing units(s) 108. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device(s) 106 can also include one or more network interface(s) 118 to enable communications between computing device(s) 106 and other networked devices, such as client computing device 120 involved in providing the arc SIP layout for user interaction, or other devices over network(s) 104. Such network interface(s) 118 can include one or more network interface controllers (NICs) or other types of transceiver devices to send and receive communications over a network. For simplicity, other components are omitted from the illustrated device(s) 106.

Other devices involved in facilitating an arc layout for SIP can include client computing device 120. Device 120 can belong to a variety of categories or classes of devices such as traditional client-type devices, desktop computer-type devices, mobile devices, special purpose-type devices, embedded-type devices, Internet of Things (IoT) devices, and/or wearable-type devices. By way of example and not limitation, computing device 120 can include, but are not limited to, smartphones, mobile phones, mobile phone-tablet hybrid devices, or other telecommunication devices, server computers or blade servers such as Web servers, map/reduce servers or other computation engines, or network-attached-storage units, laptop computers, thin clients, terminals, or other mobile computers, computer navigation client computing devices, satellite-based navigation system devices including global positioning system (GPS) devices and other satellite-based navigation system devices, personal data assistants (PDAs), and other specialized portable electronic devices, tablet computers or tablet hybrid computers, portable or console-based gaming devices or other entertainment devices such as network-enabled televisions, set-top boxes, media players, cameras, or personal video recorders (PVRs), represented graphically as a gamepad, automotive computers such as vehicle control systems, vehicle security systems, or electronic keys for vehicles, represented graphically as an automobile, wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, (e.g., bridges or dams, represented graphically as a clock) desktop computers, or integrated components for inclusion in computing devices, appliances, or other computing device(s). In some instances, device 120 may be a mobile device, while in other instances device 120 may be a stationary device.

Device 120 can represent any type of computing device having one or more processing unit(s) 122 operably connected to computer-readable media 124 such as via a bus 126, which in some instances can include one or more of a system bus, a data bus, an address bus, a PCI bus, a Mini-PCI bus, and any variety of local, peripheral, and/or independent buses.

Executable instructions stored on computer-readable media 124 can include, for example, an operating system 128, an SIP application 130, and other modules, programs, or applications that are loadable and executable by processing units(s) 122. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 120 can also include one or more network interface(s) 132 to enable communications between device 120 and other networked devices such as device(s) 106 over network(s) 104. Such network interface(s) 132 can include one or more network interface controllers (NICs) or other types of transceiver devices to send and receive communications over a network.

In the example of FIG. 1, device 120 can communicate with distributed computing resource(s) 102 when utilizing SIP application 130. For instance, in some examples, distributed computing resources 102 can use SIP tool 116 to update SIP application 130. In some examples, distributed computing resources 102 can provide a portion of and/or all of the functionality of SIP application 130 to device 120 using SIP tool 116. Additionally, or alternatively, in some examples, distributed computing resources 102 can use SIP tool 116 to receive data (e.g., customer visual designs, such as background images, themes, and/or colors) from SIP application 130. Distributed computing resources 102 can then use SIP tool 116 to transmit the data to other devices and/or make the data available (e.g., on websites).

As one example, device 120 can communicate with distributed computing resource(s) 102 to customize an SIP design. For example, SIP tool 116 can provide functionality so that a user can view various customization interfaces via device 120 to configure a look and feel of the user's keyboard. The user can then share the design with others by uploading the design to the distributed computing resource(s) 102 and/or another service provider. In some instances, a link to the design can be created and provided to the user so that the user can post the link to a social media site or elsewhere. Others can select the link and navigate to a page that shows the design and enables the other users to download the design to their respective devices for use.

Figure 2:
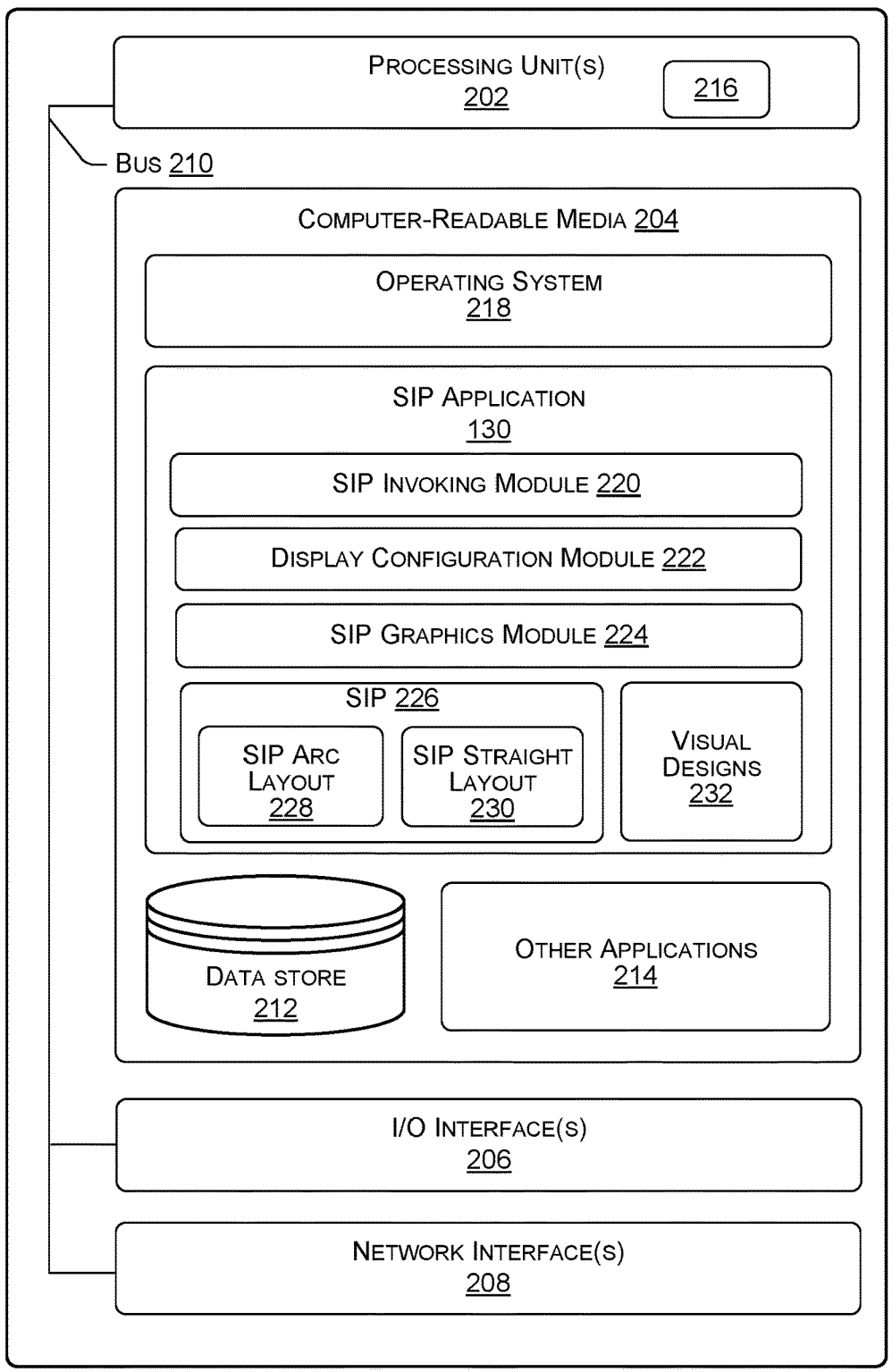
FIG. 2 is a block diagram depicting an example computing device of FIG. 1.

FIG. 2 is a block diagram depicting an example client computing device 200, such as a client device 120 from FIG. 1. In device(s) 200, processing unit(s) 202 can include processing unit(s) 122 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Computer-readable media 204 may correspond to computer-readable media 124, and can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 200, while in some examples one or more of a CPU, GPU, and/or accelerator is external to computing device 200.

Computer-readable media 204 (as well as any other computer-readable media described herein) may include computer storage media and/or communication media. Computer storage media can include volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting of a modulated data signal, a carrier wave, or a propagated signal, per se.

Input/output (I/O) interfaces 206 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a touch-sensitive display (e.g., touch screen/surface), a printer, audio speakers, a haptic output, and the like).

Network interface(s) 208, which may correspond to network interface(s) 132, can represent, for example, network interface controllers (NICs) or other types of transceiver devices to send and receive communications over a network.

Computing device 200 can further include bus 210, which can correspond to bus 126. Bus 210 can operably connect processing unit(s) 202, computer-readable media 204, I/O interface(s) 206, and network interface(s) 208. For instance, bus 210 can include one or more of a system bus, a data bus, an address bus, a PCI bus, a Mini-PCI bus, and any variety of local, peripheral, and/or independent buses.

In the illustrated example, computer-readable media 204 includes a data store 212. In some examples, data store 212 includes data storage such as a database, data warehouse, or other type of structured or unstructured data storage. In some examples, data store 212 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 212 can store data for the operations of processes, applications, components, and/or modules stored in computer-readable media 204 and/or executed by processing unit(s) 202 and/or accelerator(s). In some examples, data store 212 can store one or more of SIP application 130 or other applications 214. Alternately, some or all of the above-referenced data can be stored on separate memories 216 on board one or more processing unit(s) 202 such as a memory on board a CPU-type processor, a GPU-type processor, an FPGA-type accelerator, a DSP-type accelerator, and/or another accelerator.

In the illustrated example of FIG. 2, computer-readable media 204 also includes operating system 218, which can represent operating system 128. Additionally, computer-readable media 204 includes SIP application 130 and other applications 214. Although SIP application 130 is illustrated as being separate from operating system 218, in some instances, SIP application 130 may be integrated within operating system 218. SIP application 130 can include one or more modules and/or APIs, which are illustrated as blocks 220, 222, and 224, although this is just an example, and the number can vary higher or lower. Functionality described associated with blocks 220, 222, and 224 can be combined to be performed by a fewer number of modules and/or APIs or it can be split and performed by a larger number of modules and/or APIs.

SIP invoking module 220 includes logic to program processing unit(s) 202 of computing device 200 to facilitate Soft Input Panel (SIP) 226 in either SIP arc layout 230 and/or SIP straight layout 230. SIP arc layout 228 may include a natural one-handed SIP 226 that processing unit(s) 202 can cause to be displayed on a touch-sensitive display of computing device 200. In some examples, the touch-sensitive display can display SIP arc layout 228 using an arc and/or slanted keyboard layout, such that a user can tap and swipe through portions of the SIP 226 using a single hand. For instance, in some examples, SIP arc layout 228 can include displaying the SIP 226 using a forty-five-degree angle with respect to a bottom of the touch-sensitive display. In some examples, the SIP arc layout 228 can include displaying the SIP 226 using a different angle. For instance, the angle can include any angle between zero degrees and ninety degrees with respect to the bottom edge of the touch-sensitive display or another edge.

SIP straight layout 230 may include a two-handed SIP 226 that processing unit(s) 202 can cause to be displayed on the touch-sensitive display of the computing device 200. For instance, SIP straight layout 230 can include displaying SIP 226 using a horizontal and/or substantially straight layout, which can refer to the orientation of the keys of SIP 226 (e.g., the keys are in one or more straight lines). For instance, SIP straight layout 230 is often the default layout of SIP 226. In SIP straight layout 230, the keys may be parallel with respect to each other and/or an edge of the touch-sensitive display.

In some examples, SIP 226 includes a plurality of discrete portions, which are referred to as keys. Each of the keys of SIP 226 can represent a single character (e.g., letter, number, symbol, or other character) or two or more characters. For instance, in some examples, SIP 226 can include keys that are positioned similar to a common QWERTY keyboard. In some examples, SIP 226 can include characters other than letters or numbers. For instance, SIP 226 can include different images (e.g., emoticons) that a user selects.

To invoke (i.e., cause a display of) SIP 226 in SIP arc layout 228, keyboard invoking module 220 can detect a user input and cause display of the SIP arc layout 228 in response. For instance, in some examples, a touch-sensitive display may be displaying SIP 226 (e.g., a common QWERTY keyboard) using SIP straight layout 230. SIP 226 can include an icon that a user utilizes to invoke SIP arc layout 228. In some examples, invoking SIP arc layout 228 can include the user tapping and/or pressing down on the touch-sensitive display at a location that corresponds to the icon. Further, in some examples, invoking SIP arc layout 228 can include the user pressing down on the touch-sensitive display at a location that corresponds to the icon using his or her thumb and then dragging his or her thumb in a defined pattern across a surface of the touch-sensitive display. For instance, in one example, the defined pattern can include a circular motion that corresponds to the natural rotation of the thumb when the user's hand stays in a stationary position. In another examples, the defined pattern can include a horizontal and/or vertical motion across the surface of the touch-sensitive display. Additionally, or alternatively, the defined pattern can include any other defined motion across the surface of the touch-sensitive display.

To close SIP arc layout 228 (e.g., return to SIP straight layout 230), such that the touch-sensitive display no longer displays SIP arc layout 228, keyboard invoking module 220 can detect another user input. In some examples, the user input to close SIP arc layout 228 can include a similar input as described above when invoking SIP arc layout 228, except in a reverse direction (or in some instances, in the same direction). Additionally, or alternatively, the user input to close SIP arc layout 228 can include a different defined user input that is specific to closing SIP arc layout 228. For instance, in some examples, user input to close SIP arc layout 228 can include a different motion of the user's thumb (or other finger) across the surface of the touch-sensitive display.

Display configuration module 222 includes logic to program processing unit(s) 202 of computing device 200 to define parameters for keys of SIP 226 in either SIP arc layout 228 and/or SIP straight layout 230. The parameters for SIP 226 can include a number of keys to display, a number of characters to use for each displayed key, a size of a displayed key, a size (horizontally and/or vertically) of SIP 226, a radius associated with the arc of SIP arc layout 228, a layout (e.g., angle of rotation with respect to a bottom of the touch-sensitive display) associated with SIP arc layout 228, or the like.

In some examples, display configuration module 222 determines the parameters based on user defined parameters that are received from the user. In some examples, display configuration module 222 determines the parameters based on characteristics of the user. The characteristics can include a size of the user's hand and/or thumb (measured based on input that the touch-sensitive display receives from the user), how the user holds the computing device 200, locations one the touch-sensitive display that the user provides the most input to, or the like. Additionally, or alternatively, in some examples, display configuration module 222 determines the parameters based on characteristics of computing device 200. The characteristics can include a size (vertically and horizontally) of computing device 200 and/or the touch-sensitive display of computing device 200.

Keyboard graphics module 224 includes logic to program processing unit(s) 202 of computing device 200 to generate and display custom visual designs 232 associated with SIP 226. Visual designs 232 can include a background image, font color, font type, border, the graphical element used to facilitate SIP 226 in either SIP arc layout 230 and/or SIP straight layout 230, a swipe graphical element, or any other element of SIP 226. To generate visual designs 232, keyboard graphics module 224 can provide the user with a user interface (e.g., keyboard customization interface). The user can use the user interface to select an image from a plurality of images (e.g., predefined images, images from a user's photo album, etc.) to use as a background. The user can zoom in/out on the image, crop the image, rotate the image, etc. Keyboard graphics module 224 can also provide the user with a color wheel. The user can then select a color from the color wheel for use with SIP 226. The selected color can be used as a border of the background or for other portions of SIP 226. Alternatively, or additionally, the user may select a color for SIP 226 by dragging a color picker to a location of an image. The color may be used for a font, border, and so on of SIP 226.

Further, in some examples, keyboard graphics module 224 can select a color to apply to SIP 226. For instance, keyboard graphics module 224 can automatically determine the most prominent color, the least prominent color, or a shade of the most prominent or least prominent color from a selected image. Keyboard graphics module 224 can then apply the determined color to the SIP 226. In such examples, the color applied to SIP 226 can represent a theme of the selected image.

Besides generating and displaying custom visual designs 232 associated with SIP 226, keyboard graphics module 224 can further include logic to program processing unit(s) 202 of computing device 200 to upload visual designs 232 to sites via a network (such network 104). For instance, keyboard graphics module 224 can cause device 200 to upload one of visual designs 232 to social media site. Other users can then view the custom visual designs 232 on the social media site. Additionally, in some examples, the other users can download the custom visual designs 232 for use with their own SIP.

In the illustrated example of FIG. 2, computer-readable media 204 also includes other applications 214. Other applications 214 can include one or more applications that can receive input in the form of input from a keyboard. For instance, other applications 214 can include social media applications, text based applications, web-browsing applications, or the like. In some examples, SIP application 130 can interface with other applications 214 in order to provide SIP 226 when device 200 is executing other applications 214.

Figure 3A:
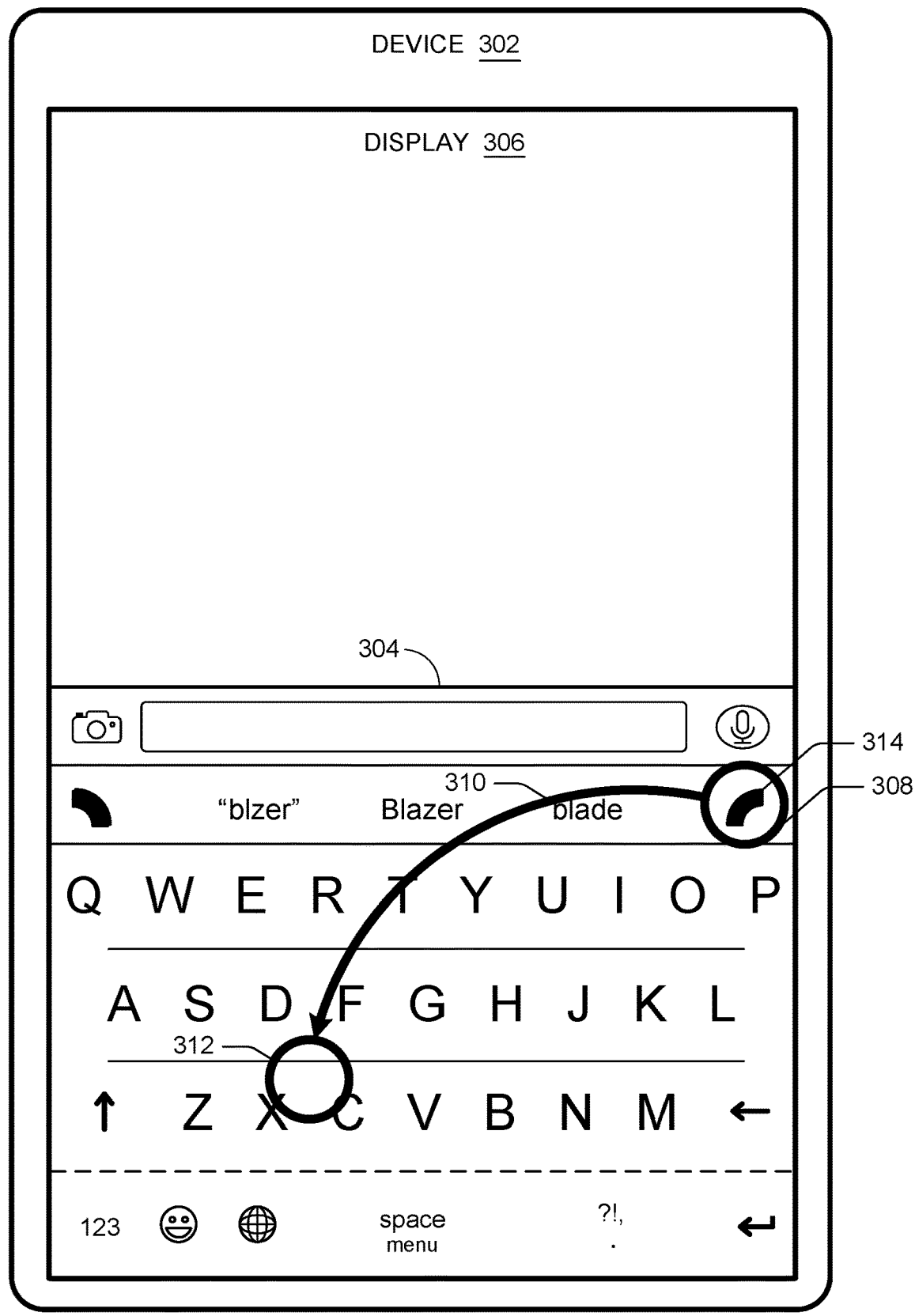
FIGS. 3A-3D depict example techniques of invoking a Soft Input Panel (SIP) in an arc layout.

FIG. 3A depicts an example process of invoking an arc keyboard using input (e.g., invoking SIP arc layout 228). As illustrated in FIG. 3A, a device 302, which may represent device 200, can display an SIP 304 (which can represent SIP 226) on display 306, which can include a touch-sensitive display. Here, SIP 304 is illustrated in a straight layout, where the characters of SIP 304 are aligned with respect to the bottom of display 306 in a straight manner. To invoke an arc layout, such as SIP arc layout 228, a user can provide input using display 306. For instance, the input includes touching the user's thumb (and/or any other finger or device/item) at location 308 on display 306, and sliding the user's thumb across display 306 using an arc motion 310 until the thumb reaches location 312 on display 306. Although arc motion 310 is illustrated in a right-to-left motion, in other instances arc motion 310 can be implemented in a left-to-right motion. In some instances, arc motion 310 can be customized to a screen size of the display 306, a type of the device, etc. Arc motion 310 can be a quarter-circle gesture.

In the example of FIG. 3A, the input starts at location 308 on display 306, which includes arc icon 314 (e.g., a graphical element in the shape of an arc). However, in other examples, the input can start at any other location on display 306. Additionally, in the example of FIG. 3A, the motion includes arc motion 310. However, in some examples, the motion can include any other type of motion. Additionally, or alternatively, in some examples, the input may not include a motion across display 306. In such examples, the input can merely include a user touching a particular portion of display 306 (e.g., contacting arc icon 314 without movement, contacting a particular corner of SIP 304, etc.).

Figure 3B:
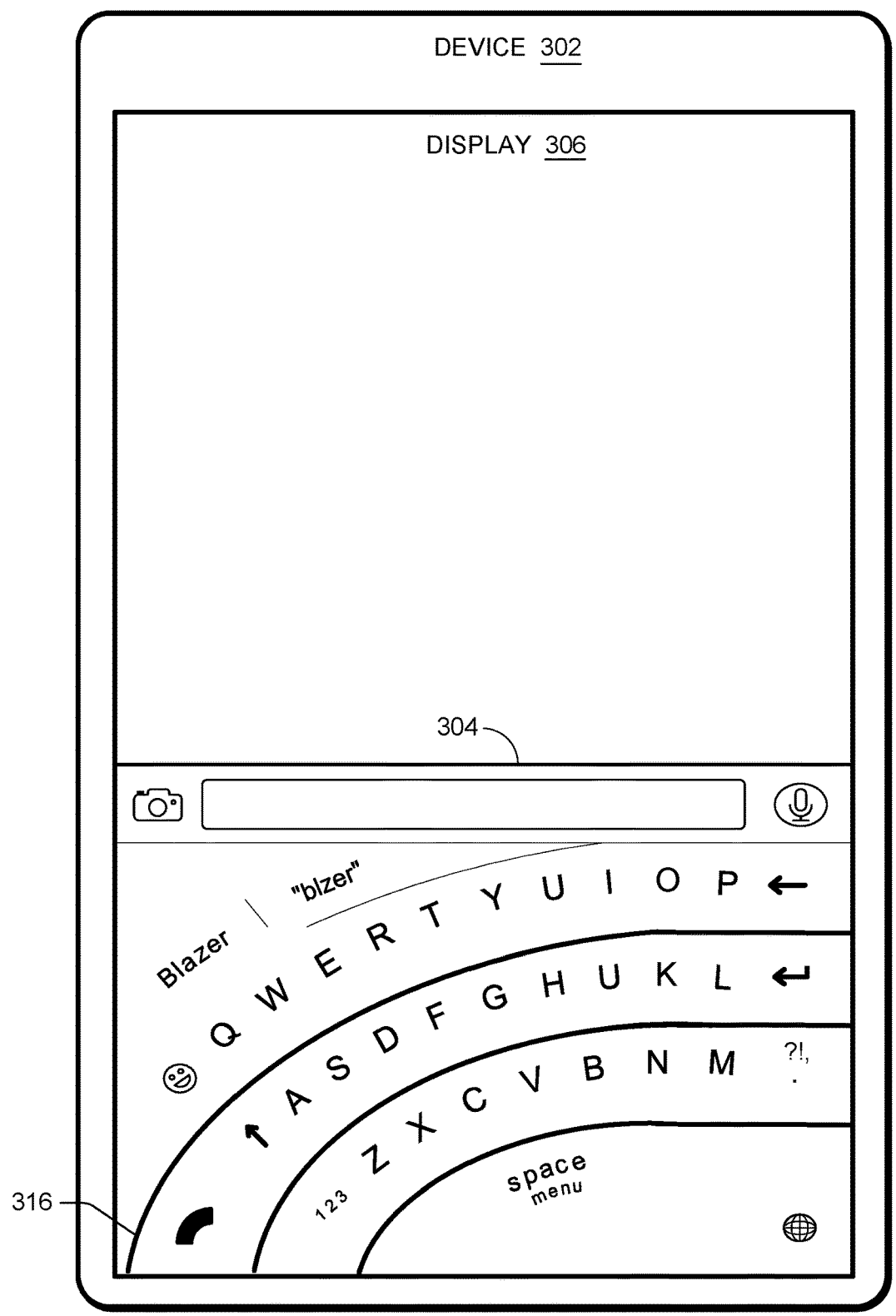

FIG. 3B depicts an example keyboard in an arc layout. In the example of FIG. 3B, SIP 304 from FIG. 3A has been configured in arc layout 316. By invoking arc layout 316 for SIP 304, the user is able to select each of the characters of the SIP 304 using his or her thumb, for example. In some examples, each character of SIP 304 can include an independent image that together create arc layout 316 of the SIP 304. As such, the spacing between characters can change in order to generate arc layout 316.

In some instances, when SIP 304 transitions from a straight layout to arc layout 316, the keys of SIP 304 can be adjusted overtime so that it appears that SIP 304 is animated. For example, each of the individual keys can move over a period of time to show that the SIP 304 is transitioning to arc layout 316 (e.g., the keys may appear to bend to an arced curve). In some instances, each of the keys can be individual data structures, graphical elements, etc. (instead of a single image for the entire SIP). This may allow the keys to be separately rendered on a display and facilitate an animation.

Figure 3C:
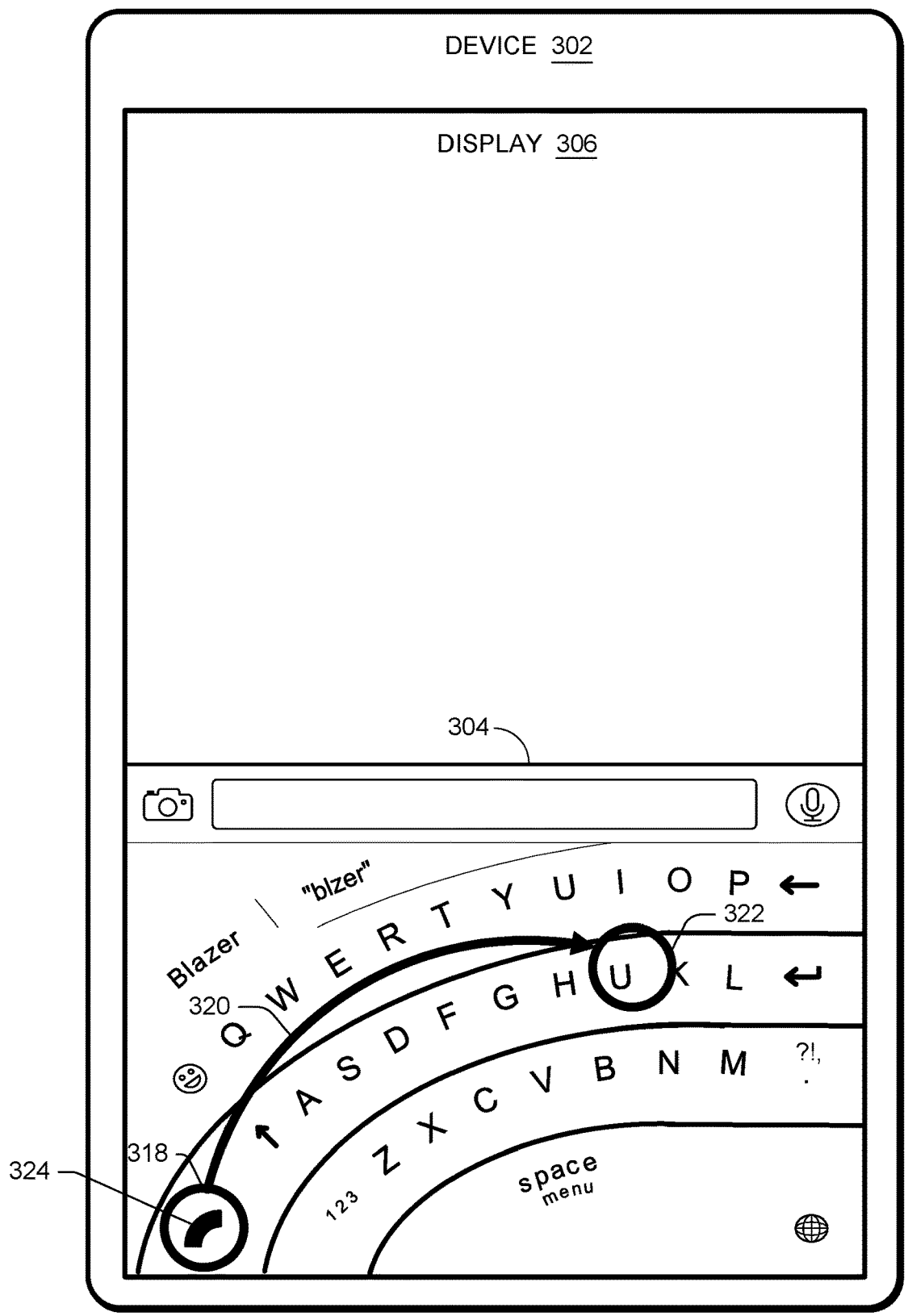

FIG. 3C depicts an example process of reverting from arc layout 316 back to a horizontal keyboard. As illustrated in FIG. 3C, to revert back to SIP 304 in a straight layout (e.g., horizontal layout), a user can provide input using display 306. For instance, the input includes touching the user's thumb (and/or any other finger or device/item) at location 318 on display 306, and sliding the user's thumb across display 306 using an arc motion 320 until the thumb reaches location 322 on display 306.

In the example of FIG. 3C, the input starts at location 318 on display 306, which includes arc icon 324. However, in other examples, the input can start at any other location on display 306. Additionally, in the example of FIG. 3C, the motion includes arc motion 320. However, in some examples, the motion can include any other type of motion that a user can make on display 306. For example, the user can slide a finger in a vertical and/or horizontal direction. Additionally, or alternatively, in some examples, the input may not include a motion across display 306. In such examples, the input can merely include a user touching display 306 (e.g., a predefined portion, such as a corner or side of the device).

Figure 3D:
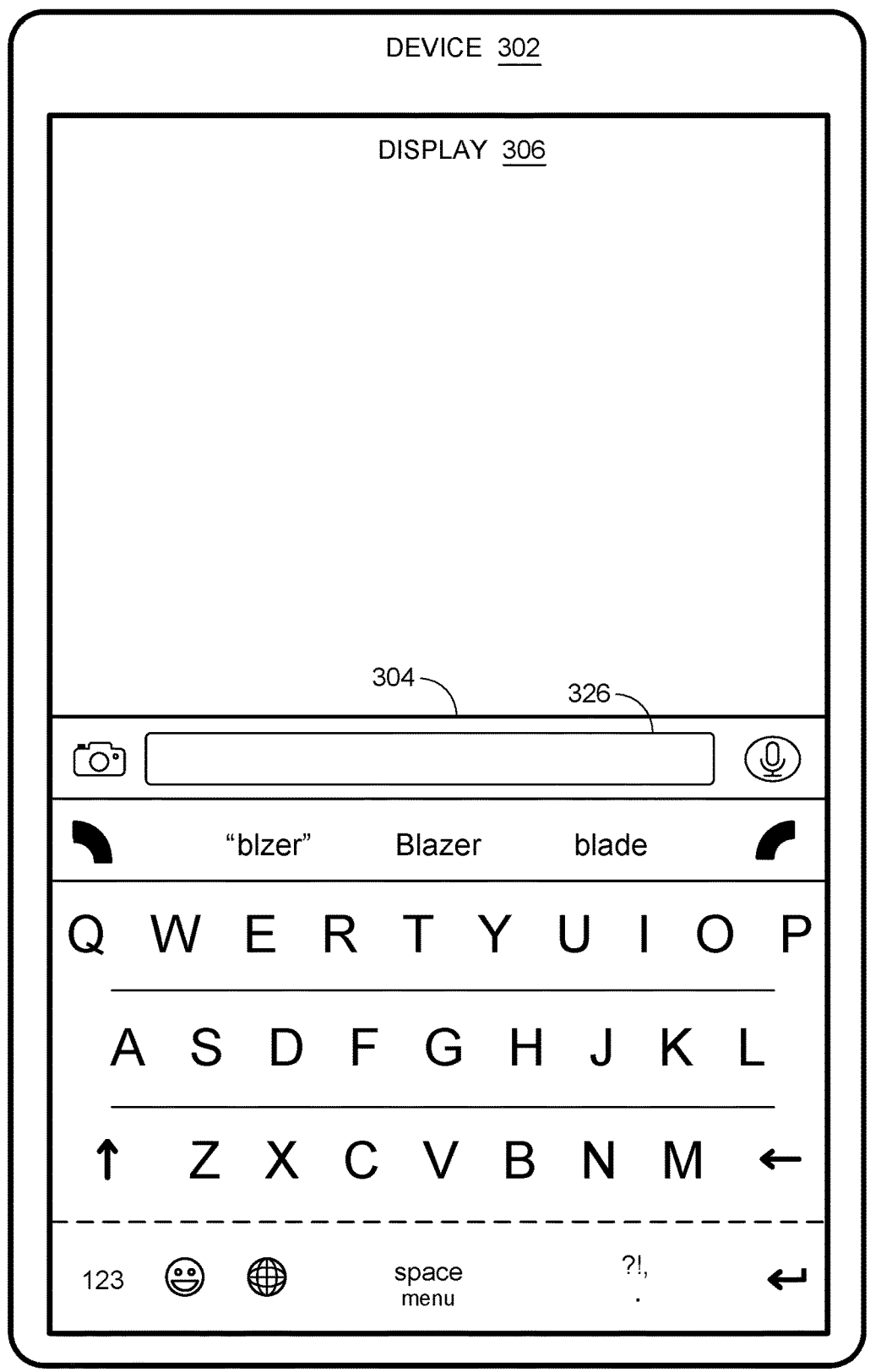

FIG. 3D depicts an example SIP 304 back in a straight layout (e.g., horizontal orientation). As illustrated in the example of FIG. 3D, the display once again displays SIP 304 in a straight layout. As illustrated in FIG. 3D, SIP 304 includes input field 326 to show characters that are input.

Although the examples of FIGS. 3A-3D are used in many instances for right-handed users, similar techniques can be implemented for left-handed users to access an arc layout. For example, an arc layout of a SIP can be accessed when a user (holding a mobile device with a left hand), selects an arc icon on a left side of a device and provides an arc motion toward a right side of the device.

Further, while in many instances SIP 304 (e.g., the keyboard) is illustrated as a single graphical element, in some instances SIP 304 can be split into two or more separate sections (e.g., graphical elements). Each section can include different keys of SIP 304 centered on different corners of a display. For example, a QWERTY keyboard can be split into two pieces with one section having half of the characters of the QWERTY keyboard and the other section having the other half of the characters of the QWERTY keyboard. In another example, keys in one section can be of one type (e.g., letters), while keys in the other section can be of another type (e.g., numbers).

Figure 4:
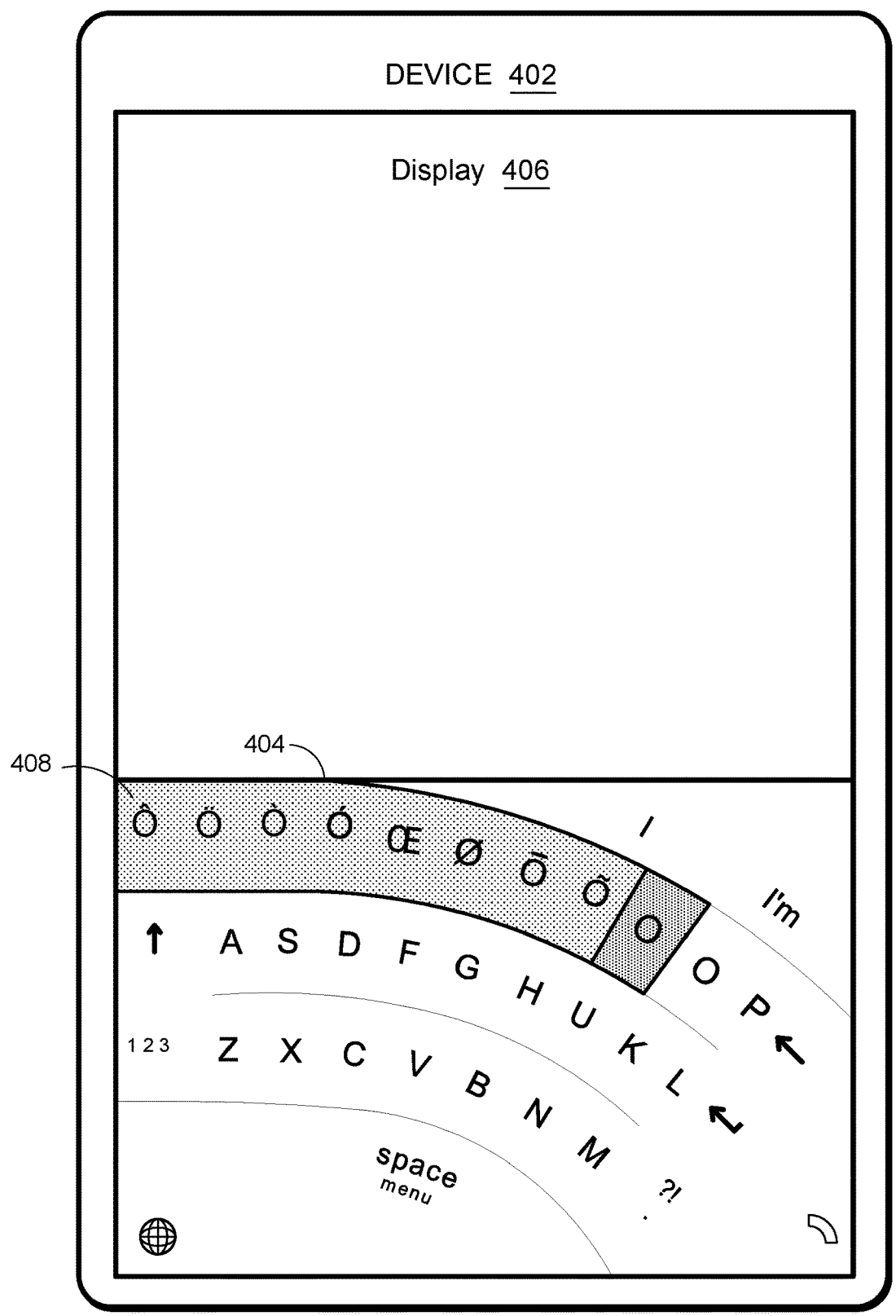
FIG. 4 depicts an example of an SIP in an arc layout that includes accent characters for user selection.

FIG. 4 depicts an example of an arc SIP that includes accent characters for user selection. As illustrated in FIG. 4, device 402, which may represent computing device 200, displays SIP 404, which may represent SIP 304, using an arc layout on display 406. A portion 408 of the arc of the SIP 404 includes accent characters for user selection. In some examples, SIP 404 displays the accent characters in response to a user input. For instance, the user may select an icon being displayed on the SIP 404 (e.g., holding an icon down that represents a character for a period of time).

In the example of FIG. 4, portion 408 of SIP 404 that includes the accent characters corresponds to the top row of characters of SIP 404. However, in some examples, one or more other rows or columns of SIP 404 may include accent characters. For example, the second and third rows of characters of the SIP 404 may include accent characters. In another example, any of the first three rows of columns of the SIP 404 may include accent characters.

Figure 5A:
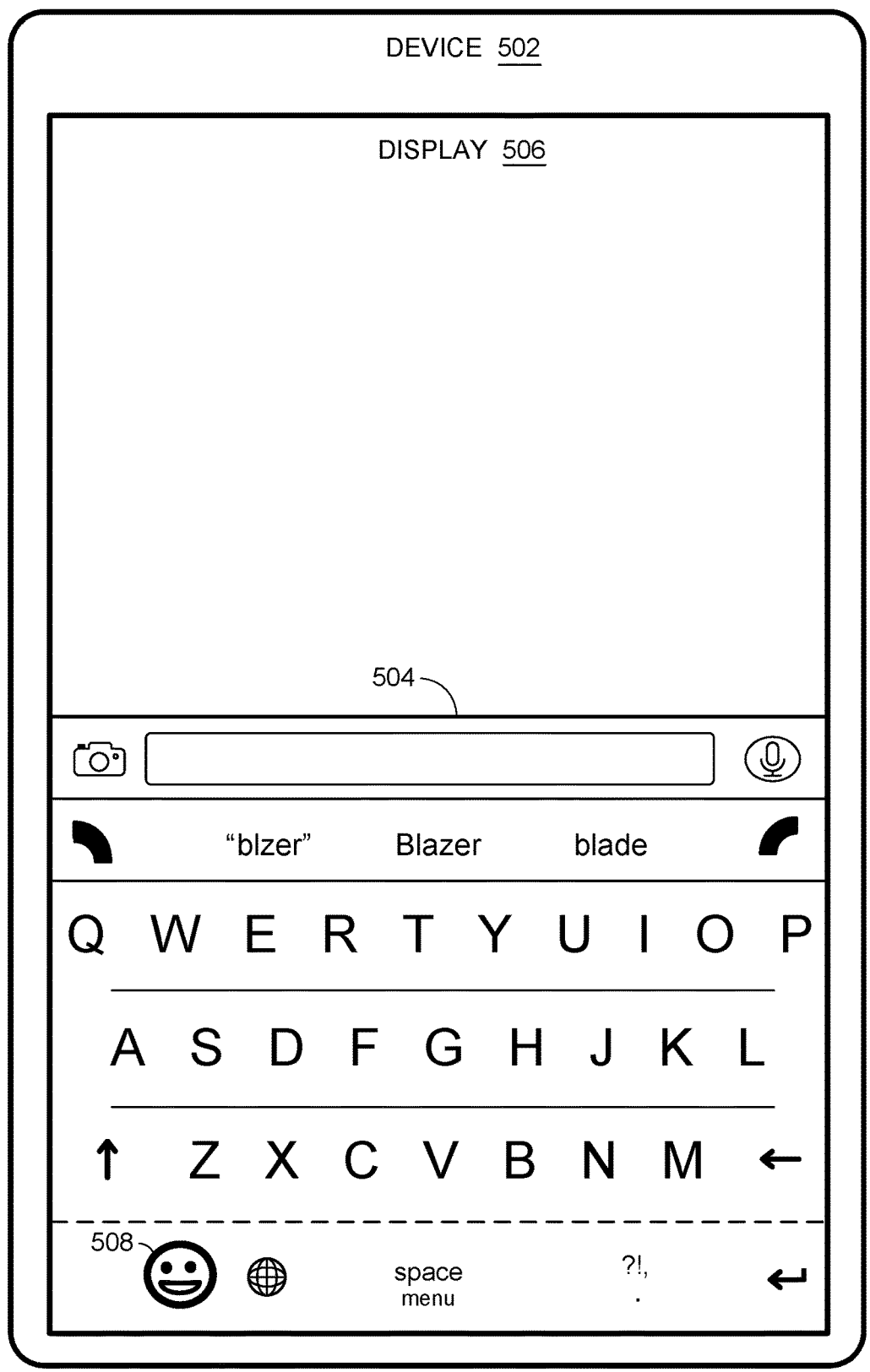
FIGS. 5A-5B depict example techniques for displaying emoticons within an SIP in an arc layout.
Figure 5B:
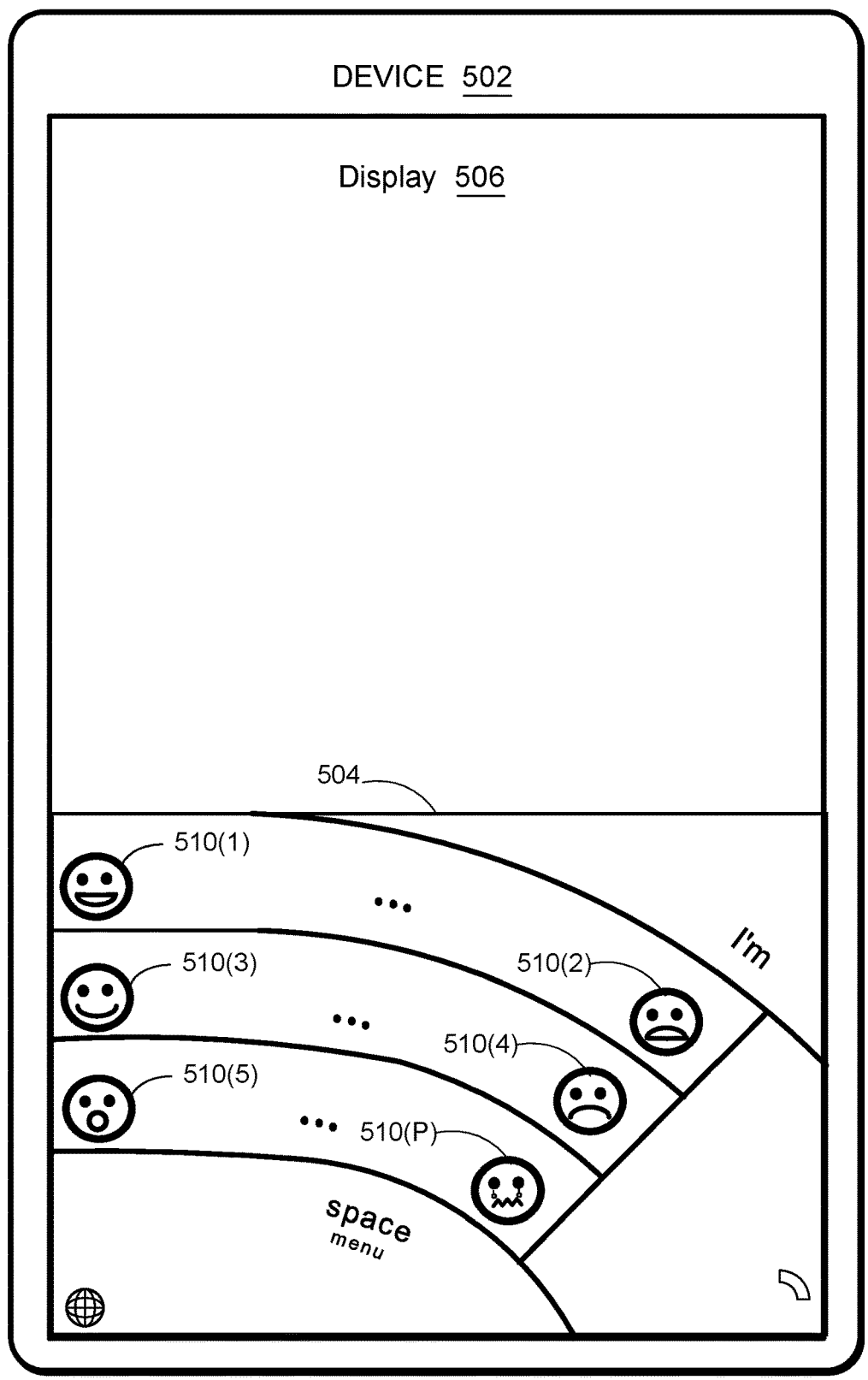

FIGS. 5A-5B depict example techniques for displaying emoticons within an SIP in an arc layout. In the example of FIG. 5A, device 502, which can represent device 200, displays SIP 504 using display 506. SIP 504 includes icon 508 (e.g., graphical element) to invoke the display of emoticon candidates.

In FIG. 5B, SIP 504 displays the emoticon candidates using the arc layout. For instance, device 502 may have received input associated with transitioning SIP 504 to an arc layout. Further, device 502 may have received a selection of icon 508 from FIG. 5A, while SIP 504 is in the arc layout. Based on the input, device 502 can replace the characters within SIP 504 with emoticon candidates 510(1)-(P). In some examples, SIP 504 displays emoticons 510(1)-(N) using three columns or rows. In some examples, SIP 504 displays emoticons 510(1)-(P) using more or less columns. In some examples, the user can use SIP 504 to scroll through candidate emoticons 510(1)-(P). For instance, the user can swipe his or her thumb on display 504 using a predefined pattern (e.g., vertically, horizontally, in an arc, or the like). In response, SIP 504 can scroll through emoticons 510(1)-(P), which causes SIP 504 to include additional emoticons that were not already included in SIP 504.

Figure 6:
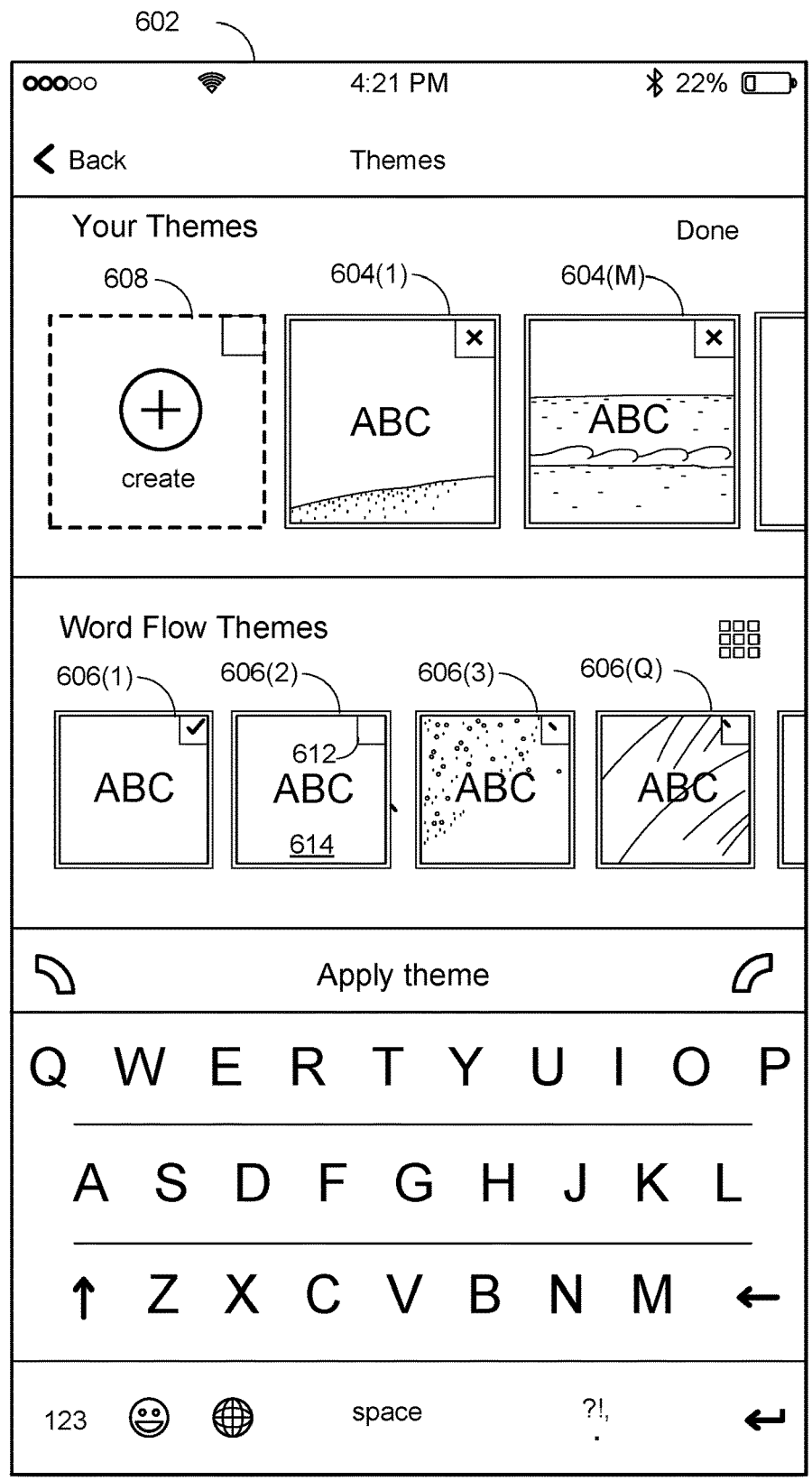
FIG. 6 depicts an example user interface for selecting a theme for an SIP.

FIG. 6 depicts an example user interface for selecting a theme for an SIP. In the example of FIG. 6, a device (e.g., device 200) may display a user interface 602. User interface 602 includes theme icons representing both user defined themes 604(1)-(M) and predefined themes 606(1)-(Q). Additionally, user interface 602 includes an area 608 to create user defined themes, as described in FIGS. 7-10. As shown in FIG. 6, each of the theme icons can display an accent color of the theme and a background. For example, the theme icon for the predefined theme 606(2) includes an accent color (e.g., color sample) 612 for the theme and a background 614 (e.g., background sample). In some examples, the user selects one of the theme icons in order to change the theme of the SIP.

Figure 7:
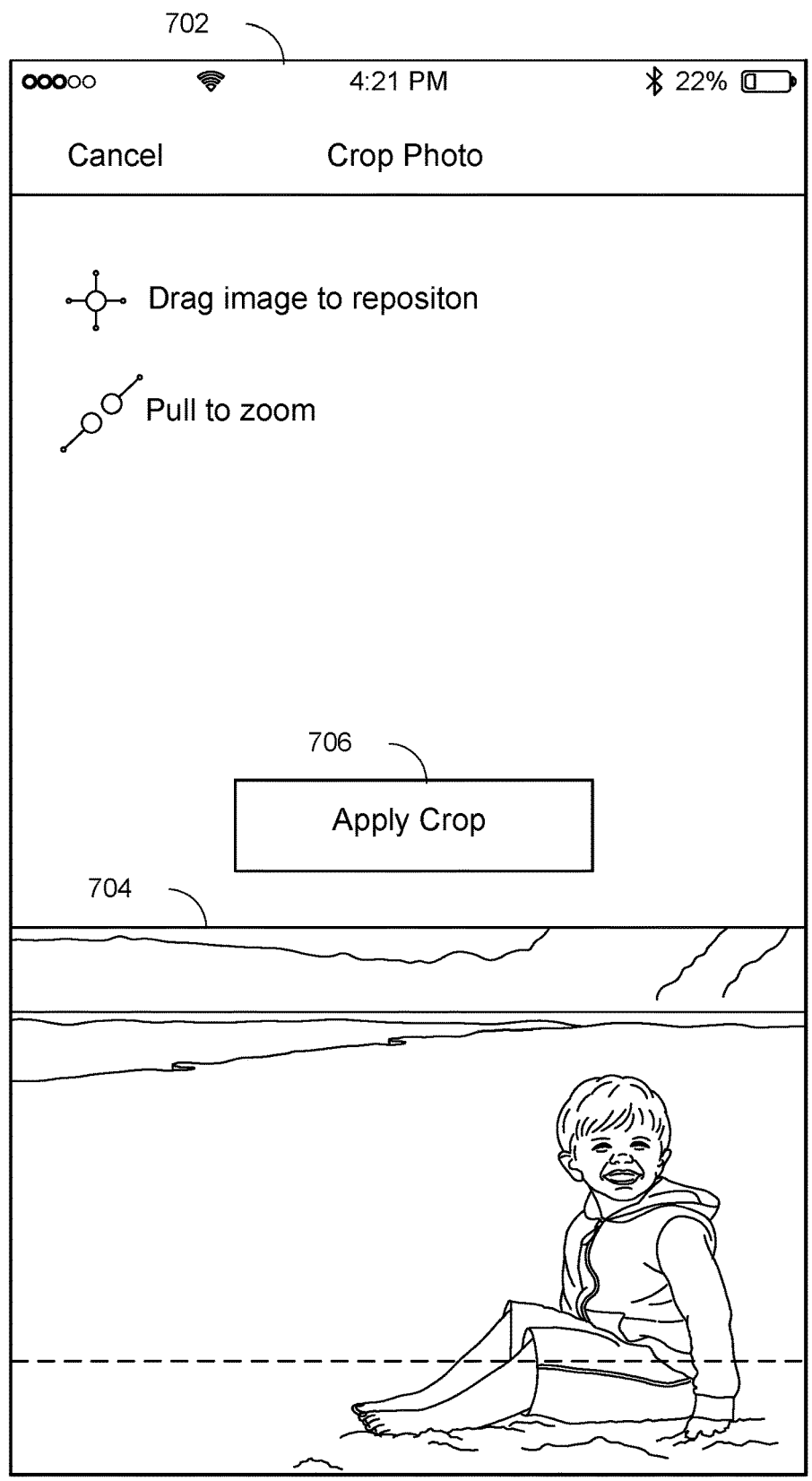
FIG. 7 depicts an example user interface for cropping a selected image for an SIP.

FIG. 7 depicts an example user interface 702 for cropping a selected image. For example, a user may have selected area 608 in order to generate a new theme for the SIP. In response to making the selection, the user can select an image 704 (e.g., an image stored on the device and/or remotely) to use as the background of SIP. As illustrated, user interface 702 presents a picture of a boy sitting on the beach. The user can then use user interface 702 to crop image 704 based on the user's preferences. For instance, the user can use user interface 702 to zoom in/out of image 704, reposition the image, adjust the horizontal/vertical boundaries of image 704, or the like. The user can then select apply crop 706 button to set image 704 as the background for the theme.

Figure 8:
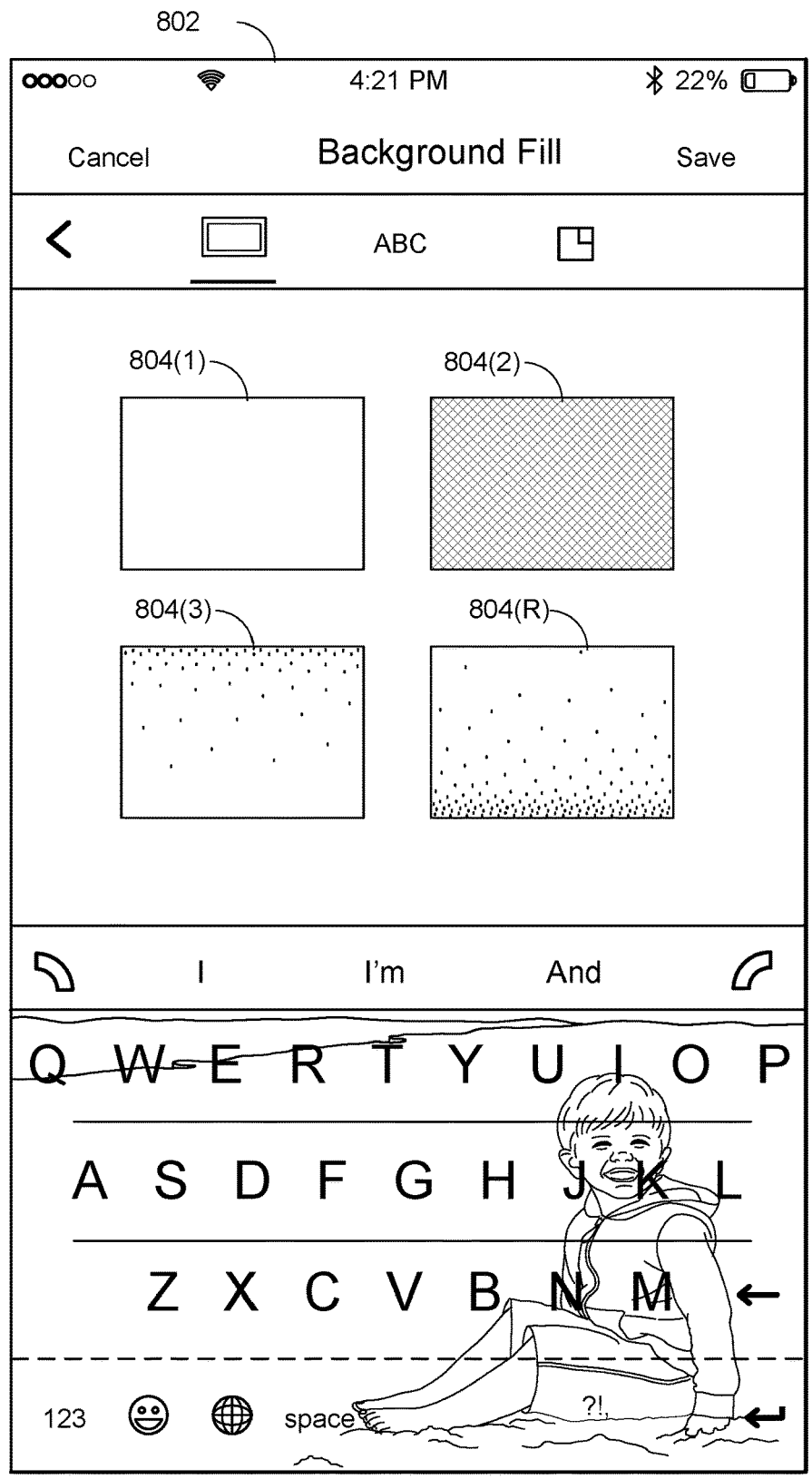
FIG. 8 depicts an example user interface for selecting a background fill for a selected image for an SIP.

FIG. 8 depicts an example user interface 802 for selecting a background fill for a selected image. For instance, user interface 802 includes various fill patters 804(1)-(R) that the user can select for the selected image (e.g., image 704). In some examples, each of the fill patterns 804(1)-(R) can include a different gradient, contrast, pattern, color, or the like. As such, selecting one of the fill patterns 804(1)-(R) will cause a filter to be applied to the image to at least one of soften the image, sharpen the image, change a color of the image, change a contrast of the image, change a pattern of the image, or the like.

Figure 9:
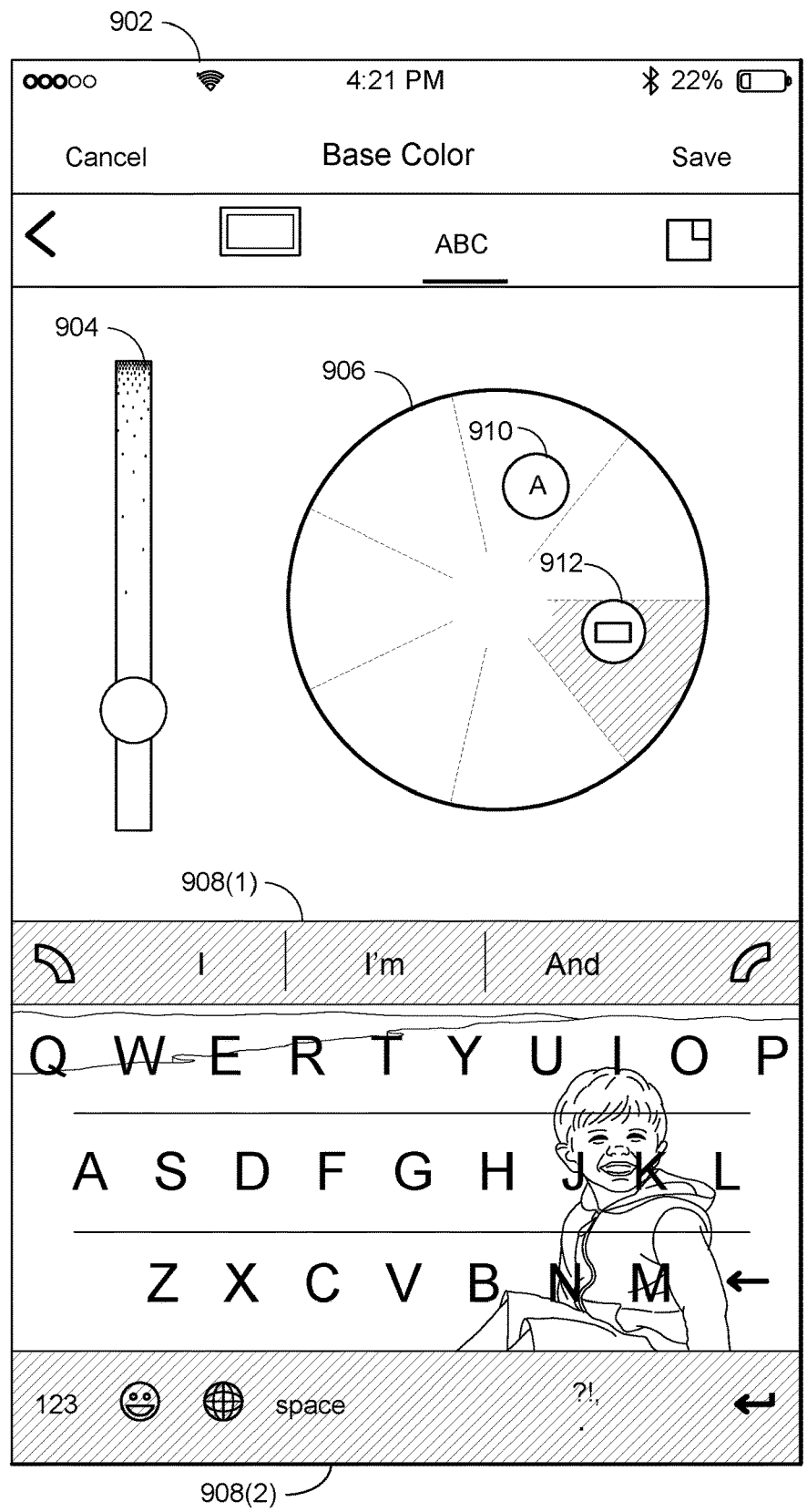
FIG. 9 depicts an example user interface for selecting a color for one or more portions of an SIP.

FIG. 9 depicts an example user interface 902 for selecting a color for one or more portions of an SIP. For instance, user interface 902 includes a selection bar 904 for selecting a level of color, contrast, brightness, or the like of the background image. User interface 902 further includes a color wheel 906 for selecting a color for the text of the SIP and a border 908(1)-(2) of the SIP. For instance, the user can use a first selection icon 910 to select the color of the text within the SIP. The user can also use a second icon 912 to select the color for border 908(1)-(2) of the SIP. Although border 908(1)-(2) of the SIP is illustrated on the top and bottom portions of the SIP, in some examples, the border can be located at different portions of the SIP. As one example, the border can include the area where text candidates are presented, as illustrated by border 908(1).

Figure 10:
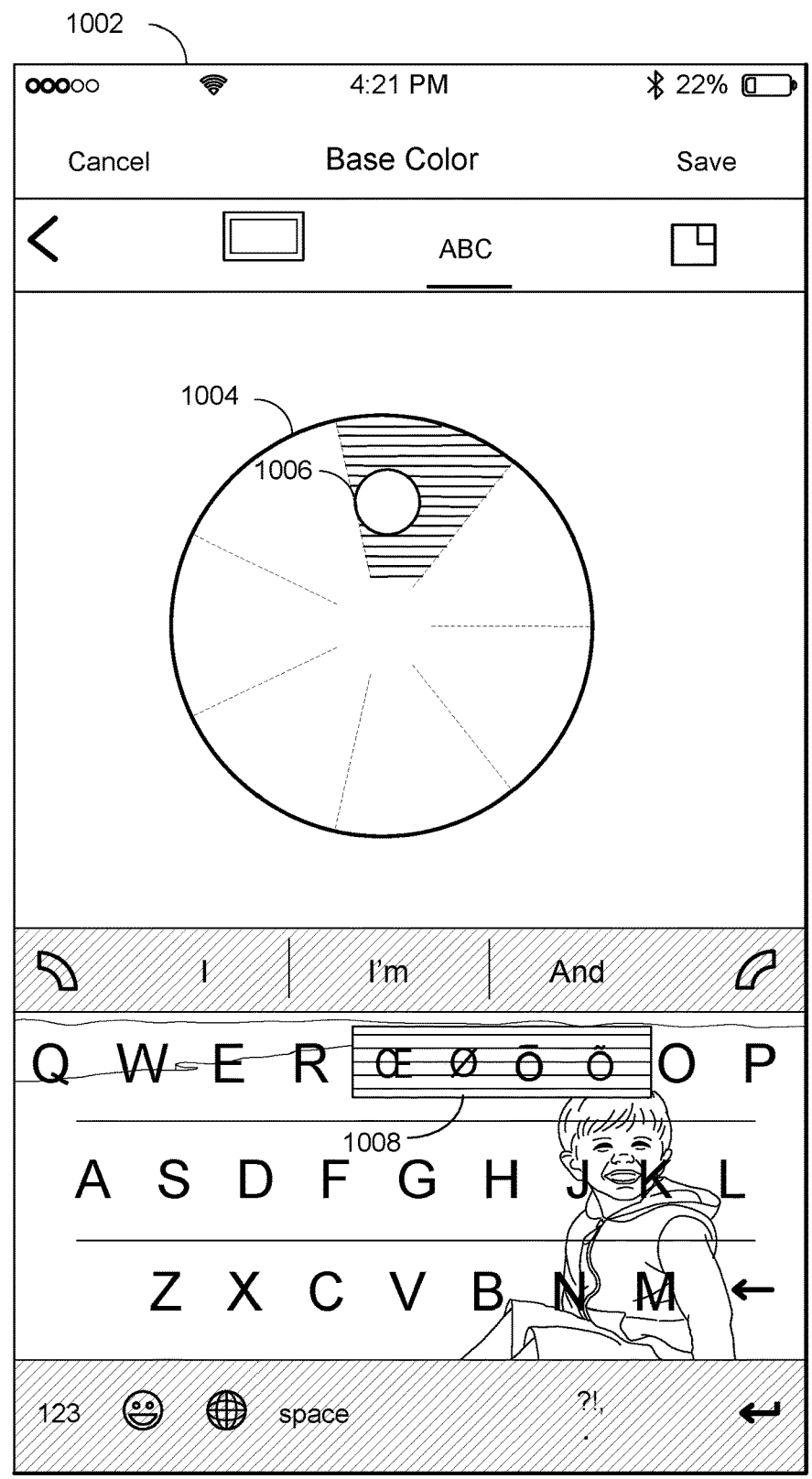
FIG. 10 depicts an example user interface for selecting a color for accent keys and/or a swipe graphical element of an SIP.

FIG. 10 depicts an example user interface 1002 for selecting a color for accent keys and/or a swipe graphical element associated with swipe input. For instance, user interface 1002 includes a color wheel 1004 for selecting the color. To select the color, the user can move the selection icon 1006 within the color wheel 1004 to position selection icon 1006 over the desired color. Based on the input, the device updates the color of accent keys 1008 using the color. The device also updates the color of the swipe graphical element using the color. In some examples, the swipe graphical element includes an animation that follows the path of touch input received when the user uses the SIP. For instance, the animation can follow the path of touch input as a user inputs a word using the SIP by moving the thumb (e.g., the input) from a first character of a word to a last character of the word in a continuous motion.

Figure 11:
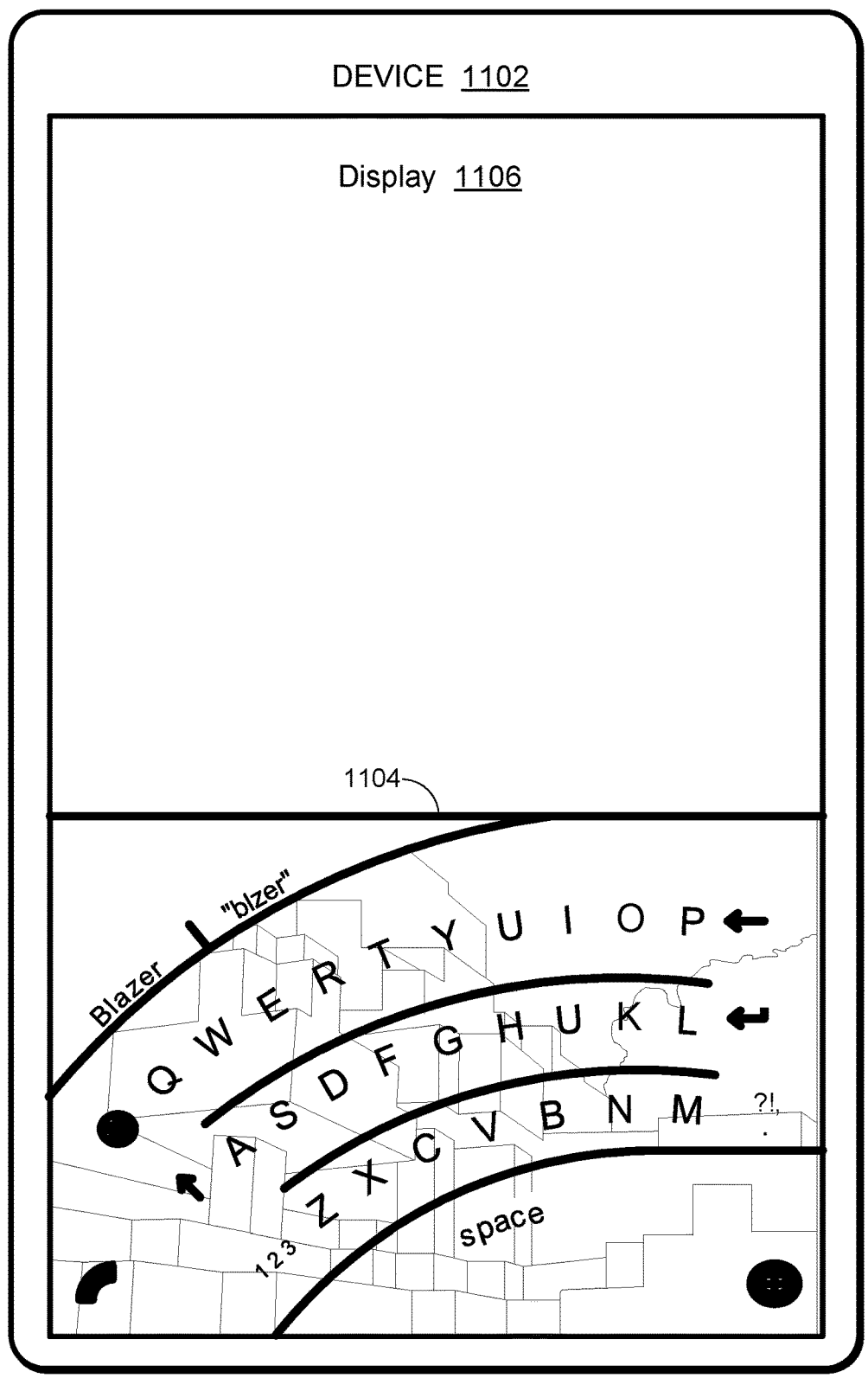
FIG. 11 depicts an example of a SIP in an arc layout that includes a predefined theme.

FIG. 11 depicts an example of an SIP in an arc layout that includes a predefined theme. For instance, a user may have selected one of the theme icons representing a predefined theme 606(1)-(Q). Based on the input, device 1102, which may represent device 200, causes SIP 1104 being displayed using display 1106 to include the elected theme. For instance, in the example of FIG. 11, the theme of SIP 1104 includes building blocks.

FIGS. 12A-12B and 13-16 illustrate example processes for implementing the techniques discussed herein. The example processes may be performed by any type of device. For example, any of the processes may be performed by distributed computing resource(s) 102, device 120, and/or any other device. The example processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer memories that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 12A:
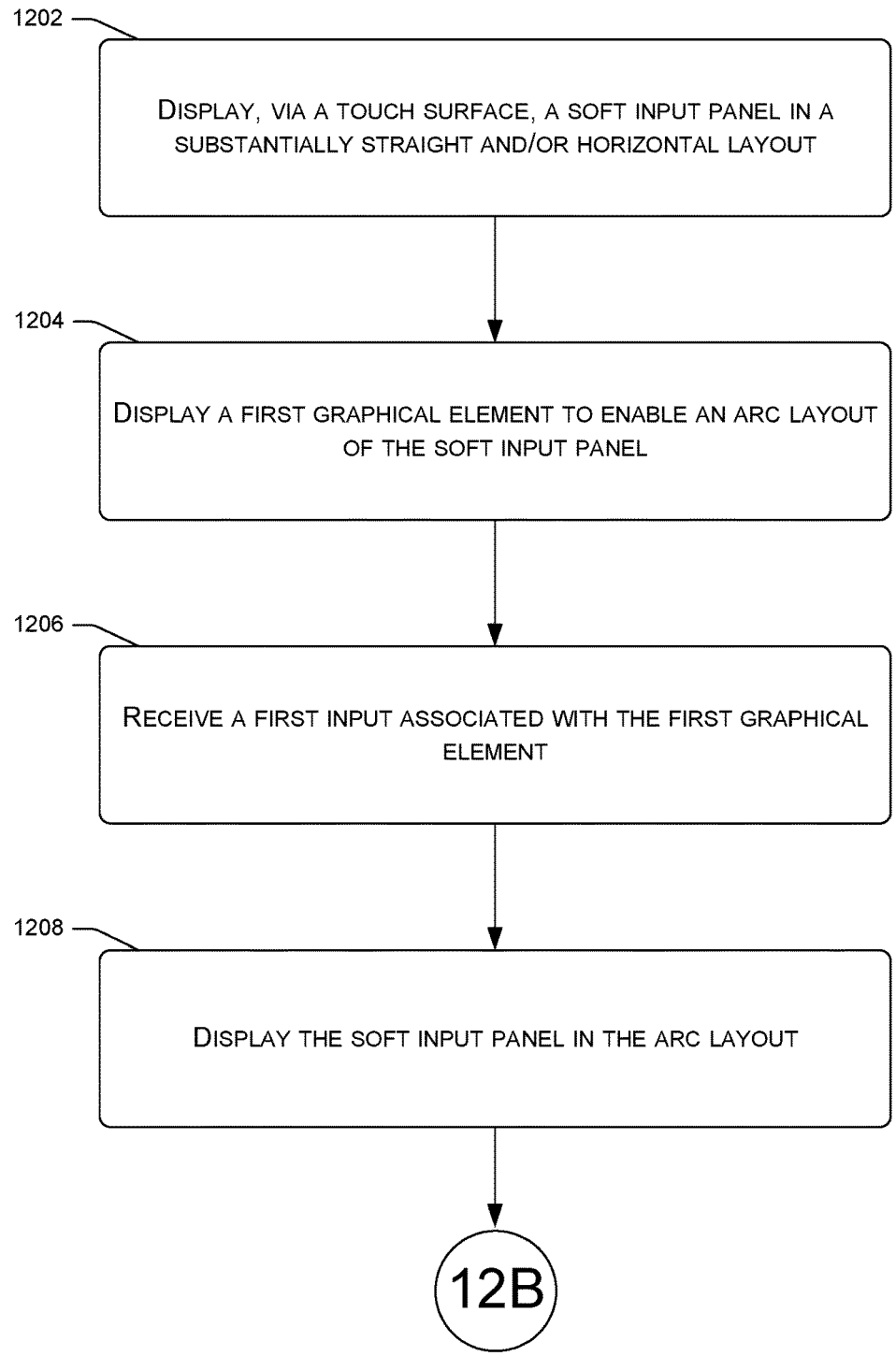
FIGS. 12A-12B illustrate a flow diagram of an example process for invoking an arc layout and/or a substantially straight layout for a soft input panel.
Figure 12B:
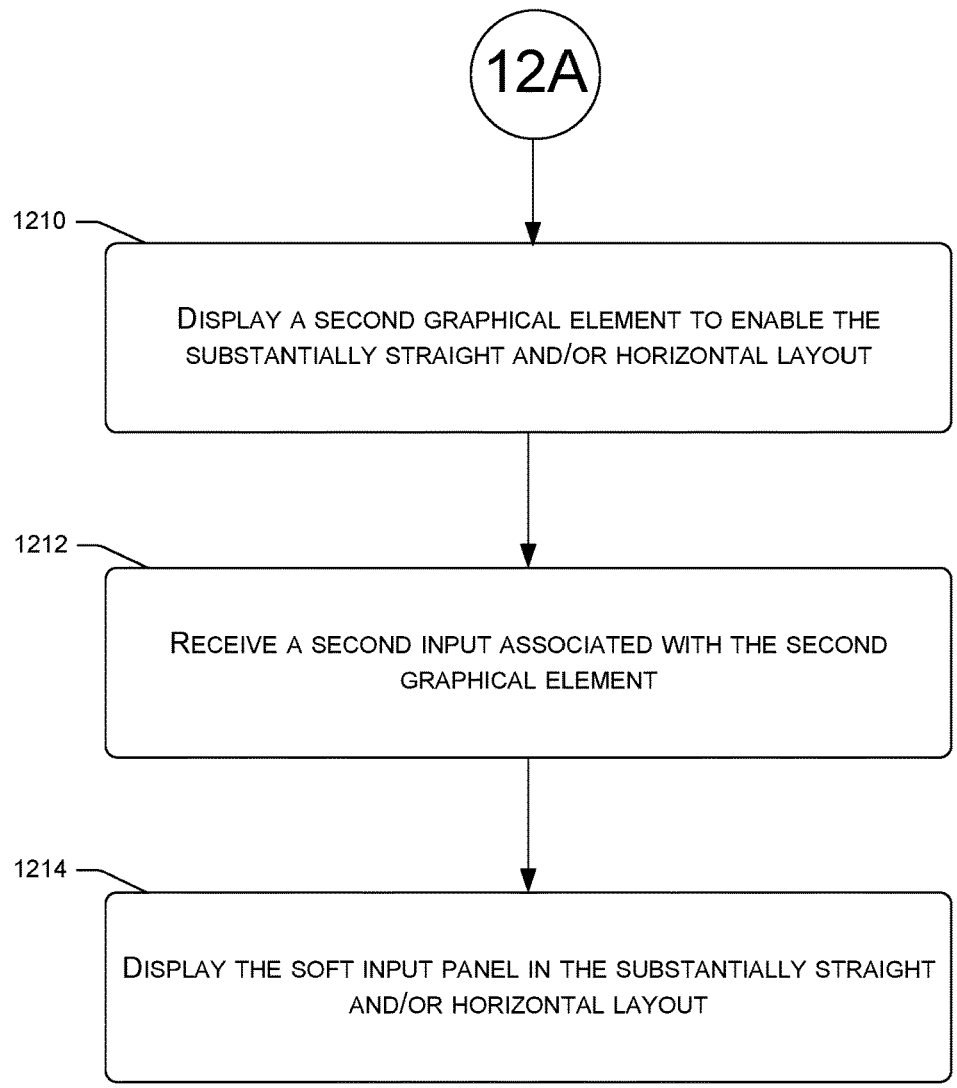

FIGS. 12A-12B illustrate a flow diagram 1200 of an example process for invoking an arc layout for a soft input panel. At block 1202, an electronic device can display, via a touch surface (via a touch screen), a soft input panel in a substantially straight and/or horizontal layout. For instance, the electronic device can display a soft input panel, such as a keyboard, using an orientation where the keys may be parallel with respect to each other and/or an edge of the touch-sensitive display.

At bock 1204, the electronic device can display a first graphical element to enable an arc layout of the soft input panel. For instance, the electronic device can display the first graphical element at a given location of the soft input panel. In some examples, the given location can include the upper-left corner, the upper-right corner, the lower-right corner, and/or the lower-left corner of the soft input panel.

At block 1206, the electronic device can receive a first input associated with the first graphical element. For instance, the electronic device can receive input associated with a user touching the touch surface at a location corresponding to the first graphical element. The input can further include the user swiping his or her thumb from the location corresponding to the first graphical element in a curved manner until the user reaches a second location on the touch surface.

At 1208, the electronic device can display the soft input panel using an arc layout. For instance, based on the first input, the electronic device can invoke an arc layout for the soft input panel. The keys of the soft input panel may follow an arced path. In some examples, arc layout can include displaying various keys of the soft input panel using various angles with respect to an edge of the touch surface.

At 1210 in FIG. 12B, the electronic device can display a second graphical element to enable the substantially straight and/or horizontal layout. For instance, the electronic device can display the second graphical element at a given location of the soft input panel in the arc layout. In some examples, the given location can include the upper-left corner, the upper-right corner, the lower-right corner, and/or the lower-left corner of the soft input panel.

At block 1212, the electronic device can receive a second input associated with the second graphical element. For instance, the electronic device can receive input associated with a user touching the touch surface at a location corresponding to the second graphical element. The input can further include the user swiping his or her thumb from the location corresponding to the second graphical element in a curved manner until the user reaches a second location on the touch surface.

At 1214, the electronic device can display the soft input panel in the substantially straight and/or horizontal layout. For instance, based on the second input, the electronic device can invoke the substantially straight and/or horizontal layout for the soft input panel.

Figure 13:
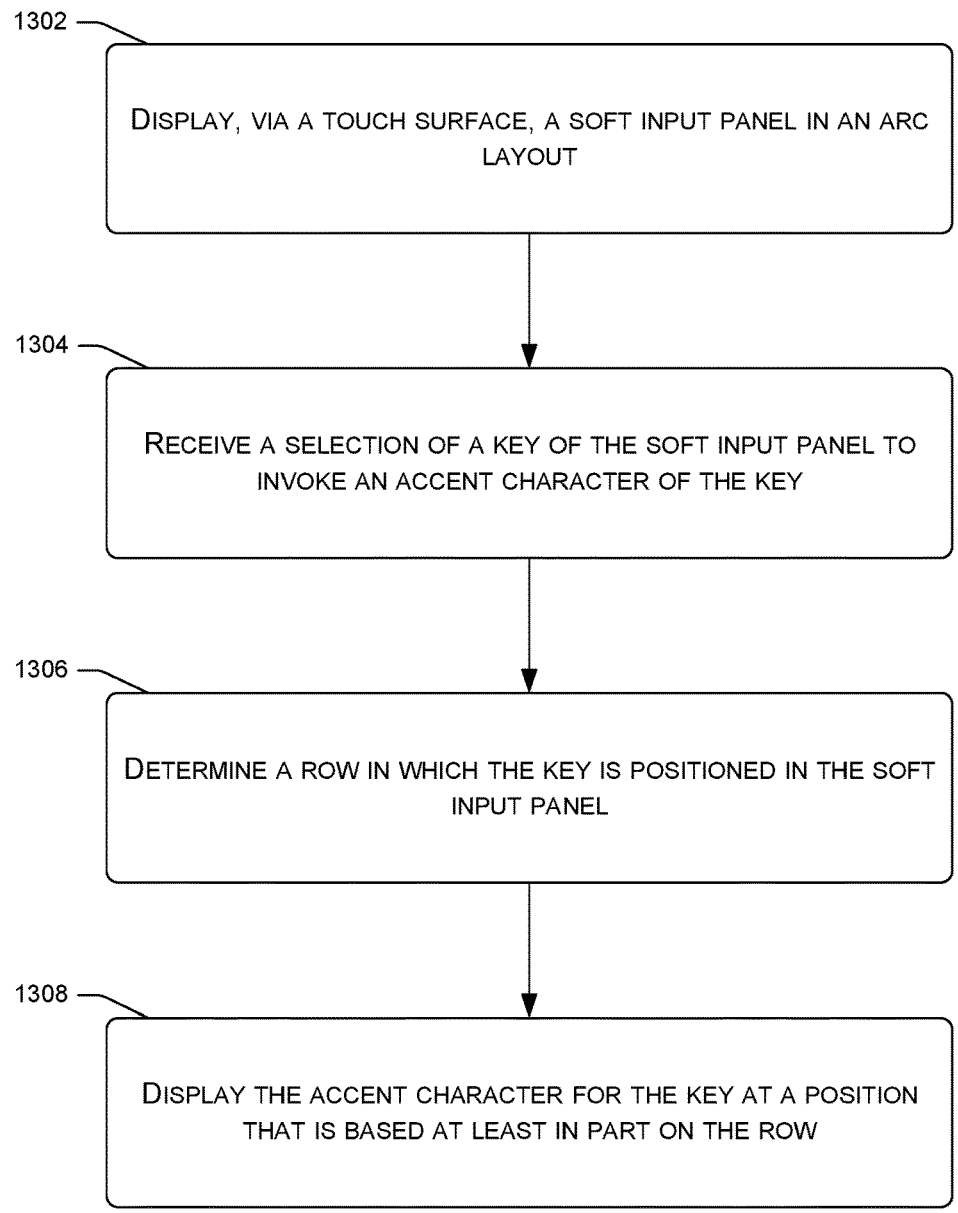
FIG. 13 illustrates a flow diagram of an example process for providing accent keys in an arc layout of a soft input panel.

FIG. 13 illustrates a flow diagram 1300 of an example process for providing accent keys in an arc layout of a soft input panel. At block 1302, an electronic device can display, via a touch surface, a soft input panel in an arc layout. At 1304, the electronic device can receive a selection of a key of the soft input panel to invoke an accent character of the key. For instance, the soft input panel can include a number of keys for receiving user input. The electronic device can receive a selection of one of the number of keys included in the soft input panel. In some examples, the selection corresponds to a user pressing and holding his or her thumb down on the touch surface at a location of the key for a period of time (e.g., predetermined period of time).

At 1306, the electronic device can determine a row in which the key is positioned in the soft input panel. For instance, the keys of the soft input panel may be positioned within rows, such as three rows. The electronic device can determine which of the rows includes the selected key. For instance, the electronic device can determine that the second row includes the selected key.

At 1308, the electronic device can display the accent character for the key at a position that is based at least in part on the row. For instance, in some examples, the electronic device can display the accent character next to the selected key in the same row as the selected key. In some examples, the electronic device can display the accent character in the row above and/or below the selected key. Additionally, or alternatively, in some examples, the electronic device can display more than one accent character for the selected key.

Figure 14:
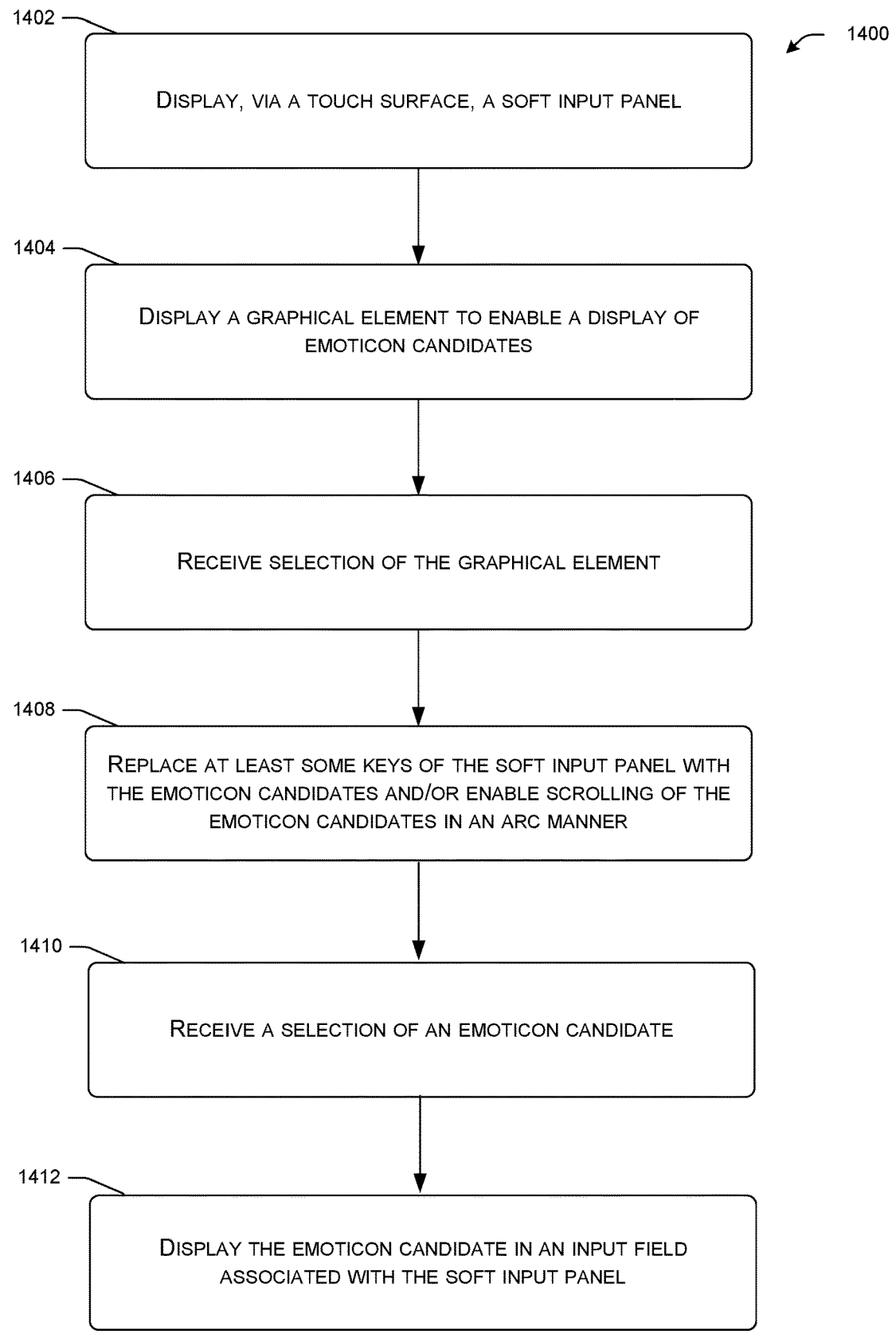
FIG. 14 illustrates a flow diagram of an example process for presenting emoticon on a soft input panel in an arc layout.

FIG. 14 illustrates a flow diagram 1400 of an example process for presenting emoticon on a soft input panel in an arc layout. At block 1402, an electronic device can display, via a touch surface, a soft input panel. For instance, in some examples, the electronic device can display the soft input panel using a substantially straight and/or horizontal layout. In some examples, the electronic device can display the soft input panel using an arc layout.

At block 1404, the electronic device can display a graphical element that enables a display of emoticon candidates. For instance, the electronic device can display the graphical element at a given location of the soft input panel. In some examples, the given location can include the upper-left corner, the upper-right corner, the lower-right corner, and/or the lower-left corner of the soft input panel.

At block 1406, the electronic device can receive a selection of the graphical element. For instance, the electronic device can receive input corresponding to a user pressing his or her thumb on the touch surface at a location of the graphical element.

At block 1408, the electronic device can replace at least some of keys of the soft input panel with emoticon candidates and/or enable scrolling of the emoticon candidates in an arc manner. For instance, the electronic device can replace one or more keys within the soft input panel with emoticon candidates while the soft input panel is in the arc layout. In some examples, while displaying the soft input panel in the arc layout, the electronic device can receive input associated with scrolling through the emoticon candidates. For instance, the electronic device can receive input corresponding to a swiping motion across the touch surface. The electronic device can then cause the soft input panel to scroll through the emoticon candidates.

At 1410, the electronic device can receive a selection of an emoticon candidate, and at 1412, the electronic device can display the emoticon candidate in an input field associated with the soft input panel. For instance, the electronic device can receive input associated with a user selecting an emoticon candidate. The input can include a user tapping on the touch surface at a location of the emoticon candidate. The electronic device can then display the selected emoticon candidate in an input field associated with the soft input panel.

Figure 15:
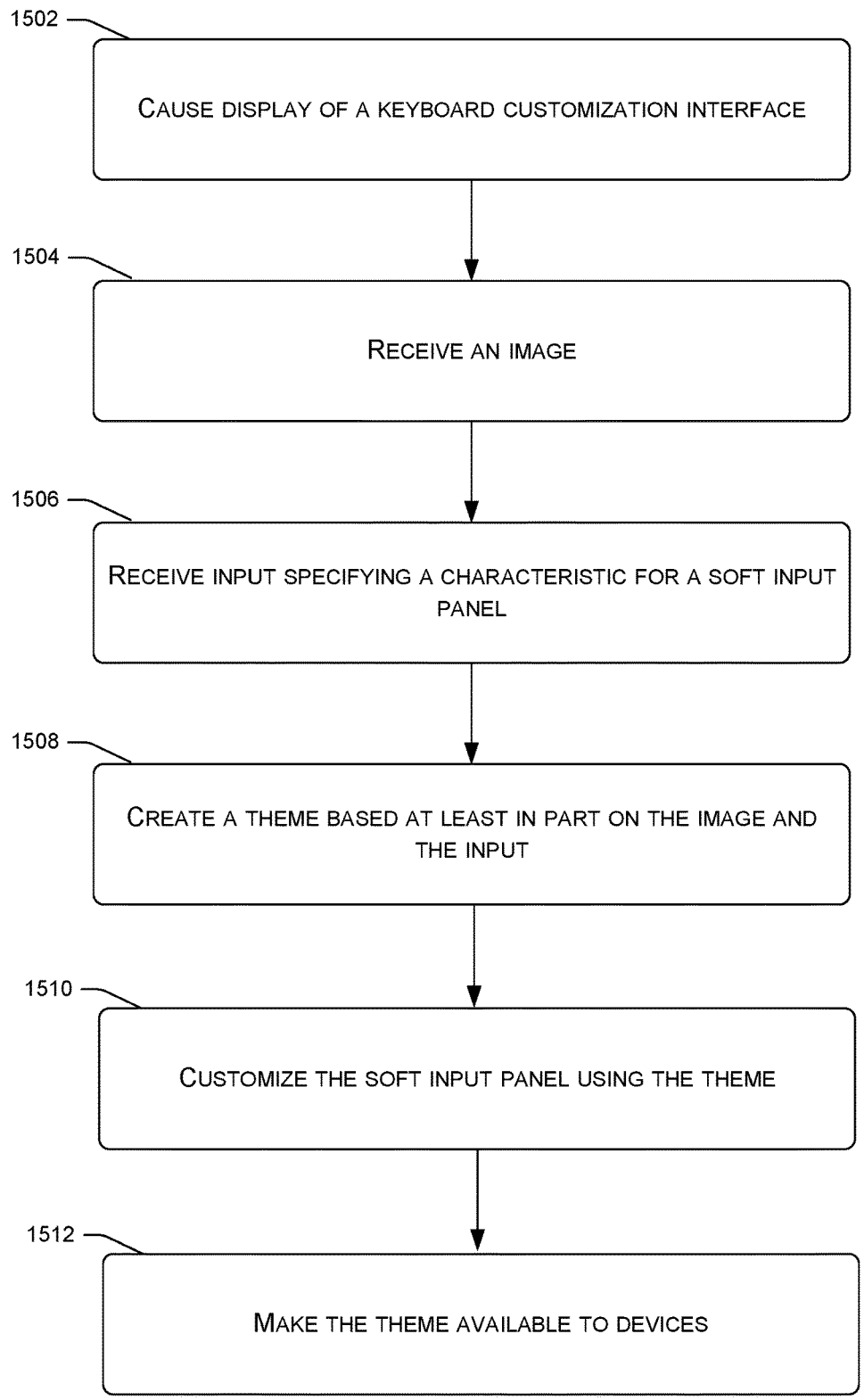
FIG. 15 illustrates a flow diagram of an example process for customizing a soft input panel.

FIG. 15 illustrates a flow diagram 1500 of an example process for customizing a soft input panel. At block 1502, an electronic device can cause display of a keyboard customization interface. For instance, the electronic device can display a keyboard customization interface that allows a user to create custom themes for soft input panels.

At 1504, the electronic device can receive an input. For instance, the electronic device can receive a selection of an image from a plurality of images via the keyboard customization interface. In some examples, the plurality of images are stored on the electronic device. In some examples, the plurality of images are stored on a separate device. In such examples, the electronic device can access the plurality of image via a network connection.

At 1506, the electronic device can receive input specifying characteristics for a soft input panel. For instance, the electronic device can receive, via the keyboard customization interface, input specifying a color, font, contrast, pattern, or the like for the soft input panel.

At 1508, the electronic device can create a theme for the soft input panel based at least in part on the image and the characteristic specified in the input. For instance, the electronic device can create a theme that includes the image, the color, the font, the contrast, the pattern, and so on. In some examples, the electronic device creates the theme by setting the image as a background, setting border colors, changing a contrast of the image using the selected contrast, changing a color of a swipe graphical representation, and so on.

At 1510, the electronic device can customize the soft input panel using the theme. For instance, the electronic device can set the soft input panel to include the theme created at 1508. Alternatively, or additionally, in some examples, a user may have selected a predefined theme from a plurality of predefined themes. In such examples, the electronic device can set the theme of the soft input panel to the predetermined theme.

At 1512, the electronic device can make the theme available to devices. For instance, the electronic device can post a link for downloading the theme to a site (e.g., online marketplace). Other devices can then use the link to download the theme. Additionally, in some examples, the electronic device can send the theme to other devices. Further, the theme may otherwise be made available to devices.

Figure 16:
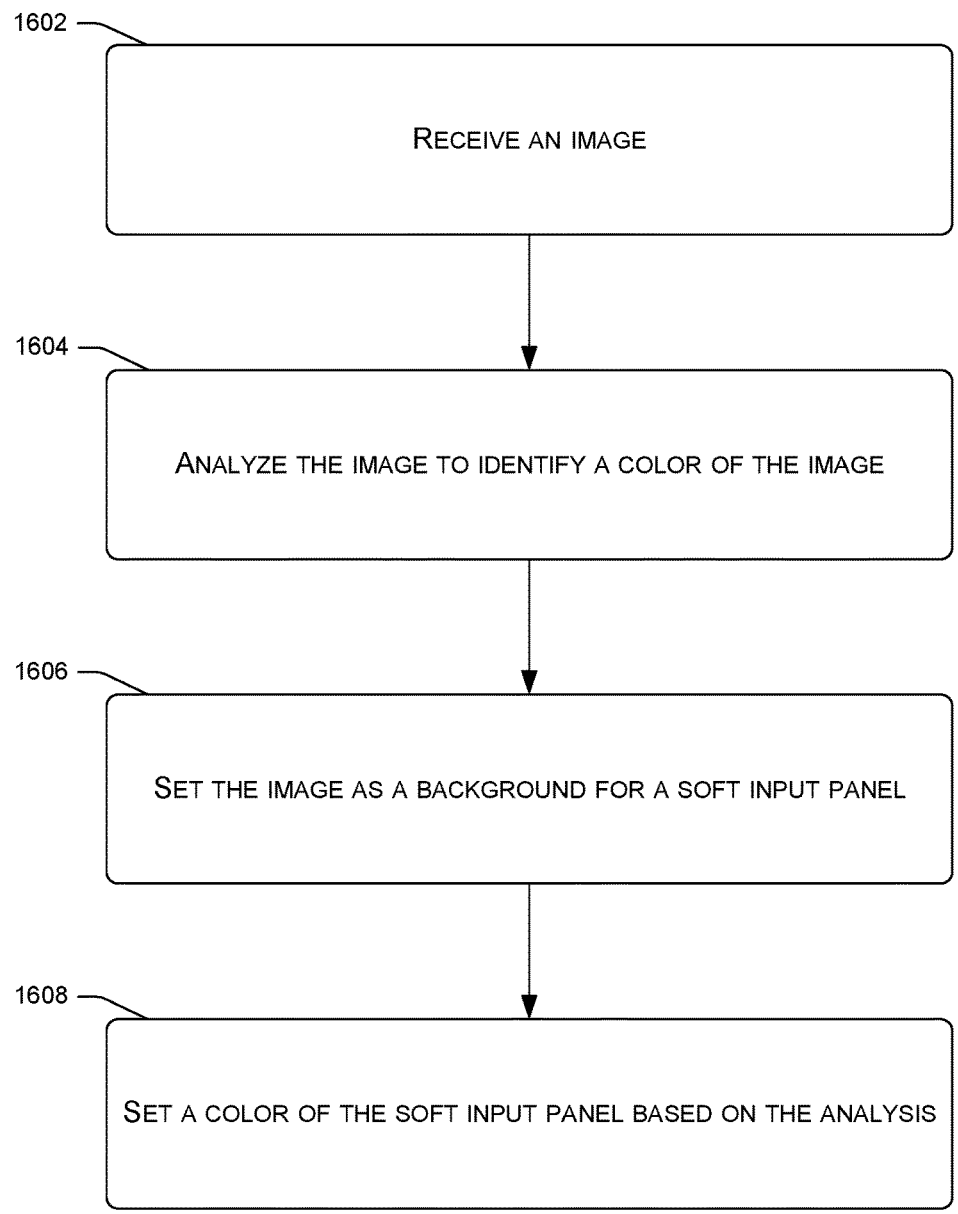
FIG. 16 illustrates a flow diagram of an example process for analyzing an image and customizing a soft input panel based on the analysis.

FIG. 16 illustrates a flow diagram 1600 of an example process for analyzing an image and customizing a soft input panel based on the analysis. At 1602, an electronic device can receive an image. For instance, the electronic device can receive a selection of an image from a plurality of images via a keyboard customization interface. In some examples, the plurality of images are stored on the electronic device. In some examples, the plurality of images are stored on a separate device. In such examples, the electronic device can access the plurality of image via a network connection.

At 1604, the electronic device can analyze the image to identify a color of the image. For instance, the electronic device can automatically determine a most prominent color (e.g., the color used the most within the image, etc.), a least prominent color (e.g., the color used the least within the image), and/or a shade of the most prominent or least prominent color from the image.

At 1606, the electronic device can set the image as a background for a soft input panel.

At 1608, the electronic device can set a color of the soft input panel based on the analysis. For instance, the electronic device can apply the determined color to a portion of the soft input panel. For instance, the electronic device can apply the determined color to a top portion of the soft input panel, a bottom portion of the soft input panel, characters used for the soft input panel, a text input field, and so on. In some instances, the color that is applied may be a particular percentage darker or lighter than the most/least prominent color of the image.

Example Clauses

Paragraph A: A method comprising: displaying, via a touch surface, a keyboard in a substantially straight layout; displaying a graphical element at a top portion of the keyboard, the graphical element to enable an arc layout of the keyboard; receiving a swipe of the graphical element in a curved manner toward a bottom portion of the keyboard; and in response to receiving the swipe, displaying the keyboard in the arc layout.

Paragraph B: A method as Paragraph A recites, wherein displaying the keyboard in the arc layout includes splitting the keyboard into a first section and a second section and displaying the first section in a first corner of the touch surface in the arc layout and displaying the second section in a second corner of the touch surface in the arc layout, the first section extending from a vertical side of the touch surface to a horizontal side of the touch surface and the second section extending from another vertical side of the touch surface to the horizontal side of the touch surface.

Paragraph C: A method as either Paragraph A or Paragraph B recites, wherein the keyboard includes a plurality of keys, the top portion of the keyboard is above at least some of the plurality of keys, and the bottom portion of the keyboard is below at least some of the plurality of keys.

Paragraph D: A method as any of Paragraphs A-C recites, further comprising: identifying input candidates for user input that is provided via the keyboard; and displaying the input candidates along the top portion of the keyboard in the arc layout, each of the input candidates being displayed along an arc path.

Paragraph E: A method as any of Paragraphs A-D recites, further comprising: outputting audio indicating that the keyboard has been changed to the arc layout.

Paragraph F: A method as any of paragraphs A-E recites, further comprising: displaying another graphical element at the bottom portion of the keyboard; receiving another swipe of the graphical element in a curved manner toward the top portion of the keyboard; and in response to receiving the other swipe, displaying the keyboard in the straight layout.

Paragraph G: A method as any of Paragraphs A-F recites, further comprising: outputting audio indicating that the keyboard has been changed back to the straight layout.

Paragraph H: A computer-readable medium having computer-executable instructions thereon, the computer-executable instructions to configure a computer to perform a method as any of Paragraphs A-G recites.

Paragraph I: A device comprising: a computer-readable media having computer-executable instructions thereon to configure a computer to perform a method as any of Paragraphs A-G recites, the processing unit adapted to execute the instructions to perform the method as any of Paragraphs A-G recites.

Paragraph J: A system comprising: one or more processors; a touch screen communicatively coupled to the one or more processors and configured to display a soft input panel that includes a plurality of keys and a graphical element, the graphical element enabling a layout of the soft input panel to be changed; and memory communicatively coupled to the one or more processors and storing executable instructions that, when executed by the one or more processors, cause the one or more processors to perform operations comprising: receiving, via the touch screen, touch input of the graphical element; and in response to receiving the touch input of the graphical element, updating the soft input panel to be aligned in an arc layout.

Paragraph K: A system as Paragraph J recites, wherein the updating the soft input panel includes providing an animation that transitions the soft input panel from a horizontal layout where keys of the soft input panel are aligned substantially straight to the arc layout where the keys of the input panel are substantially arced.

Paragraph L: A system as either Paragraph J or Paragraph K recites, wherein the displaying the graphical element comprises displaying the graphical element in a top corner of the soft input panel and the receiving the touch input comprises receiving a swipe of the graphical element in a curved manner toward a bottom portion of the soft input panel.

Paragraph M: A system as any of Paragraphs J-L recites, wherein the touch screen is configured to display another graphical element to enable display of emoticon candidates, and the operations further comprise: receiving, via the touch screen, a selection of the other graphical element; in response to receiving the selection of the other graphical element and while the soft input panel is displayed in the arc layout, replacing at least some keys of the soft input panel with the emoticon candidates; receiving, via the touch screen, a selection of an emoticon candidate of the emoticon candidates; and causing display of the emoticon candidate in an input field associated with the soft input panel.

Paragraph N: A system as Paragraph M recites, wherein the operations further comprise: enabling scrolling of the emoticon candidates in an arc manner according to the arc layout of the soft input panel.

Paragraph O: A system as Paragraph M recites, wherein the touch screen is configured to display the other graphical element at least one of above at least some of the keys of the soft input panel, below at least some of the keys of the soft input panel, or adjacent to a space key of the soft input panel.

Paragraph P: A system as any of Paragraphs J-O recites, wherein the operations further comprise: receiving a selection of a key of the soft input panel to invoke an accent character of the key; and determining a row in which the key is positioned in the soft input panel; and wherein the display is configured to display the accent character for the key at a position that is based at least in part on the row in which the key is positioned in the soft input panel.

Paragraph Q: A system as Paragraph P recites, wherein: the determining the row comprises determining that the row is a top row of the soft input panel; and the display is configured to display the accent character to a side of the key an in arced manner.

Paragraph R: A system as Paragraph P recites, wherein: the determining the row comprises determining that the row is not a top row of the keyboard; and the display is configured to display the accent character above the key in an arced manner.

Paragraph S: A mobile device comprising: one or more processors; a touch surface communicatively coupled to the one or more processors and configured to display a keyboard in a substantially straight layout and a graphical element at a top portion of the keyboard; and memory communicatively coupled to the one or more processors and storing executable instructions that, when executed by the one or more processors, cause the one or more processors to perform operations comprising: receiving a swipe of the graphical element in a curved manner toward a bottom portion of the keyboard; and in response to receiving the swipe motion, instructing the touch surface to display the keyboard in an arc layout.

Paragraph T: A mobile device as Paragraph S recites, wherein the touch surface is configured to transition to the keyboard to the arc layout by displaying an animation that transitions the keyboard from the substantially straight layout to the arc layout.

Paragraph U: A mobile device as either Paragraph S or Paragraph T recites, wherein the touch surface is further configured to display another graphical element at the bottom portion of the keyboard and display the keyboard in the substantially straight layout in response to receiving another swipe of the graphical element in a curved manner toward the top portion of the keyboard.

Paragraph V: A mobile device as any of Paragraphs S-U recites, wherein the touch surface is configured to display the keyboard in the arc layout by displaying a first section of the keyboard in a first corner of the touch surface in the arc layout and displaying a second section of the keyboard in a second corner of the touch surface in the arc layout, the first section extending from a vertical side of the touch surface to a horizontal side of the touch surface and the second section extending from another vertical side of the touch surface to the horizontal side of the touch surface.

Paragraph W: A method comprising: providing, by a computing device, a keyboard customization interface to customize a design of a soft input panel of a keyboard that is configured to be displayed in an arc layout; receiving, via the keyboard customization interface, an image; setting the image as a background of the soft input panel; receiving, via the keyboard customization interface, first user input specifying a color for a border of the soft input panel; setting the border of the soft input panel to the color specified in the first user input; receiving, via the keyboard customization interface, second user input specifying a color for characters of the soft input panel; setting the characters of the soft input panel to the color specified in the second user input; receiving, via the keyboard customization interface, third user input specifying a color for a swipe graphical element associated with swipe input; setting the color for the swipe graphical element to the color specified in the third user input; and causing, by the computing device, the soft input panel of the keyboard to be implemented.

Paragraph X: A method as Paragraph W recites, wherein the causing the soft input panel of the keyboard to be implemented comprises displaying keys of the keyboard on the image in an overlaid manner, the keys being displayed with the characters according to the color set for the characters of the soft input panel.

Paragraph Y: A method as either Paragraph W or Paragraph X recites, further comprising: applying a filter to the image to at least one of soften the image, sharpen the image, change a color of the image, or change a contrast of the image.

Paragraph Z: A method as any of Paragraphs W-Y recites, further comprising: analyzing the image; selecting a most prominent color of the image based at least in part on the analysis; and setting a color of a portion of the soft input panel of the keyboard based at least in part on the most prominent color of the image.

Paragraph AA: A method as Paragraph Z recites, wherein the setting the color of the portion of the soft input panel of the keyboard comprises setting the color of the portion of the soft input panel of the keyboard to be a particular percentage darker or lighter than the most prominent color of the image.

Paragraph AB: A method as any of Paragraphs W-AA recites, wherein the border of the soft input panel comprises at least one of a bottom row of keys of the keyboard, a top row of keys of the keyboard, or an input field portion of the keyboard.

Paragraph AC: A method as any of Paragraphs W-AB recites, wherein the keyboard customization interface presents a color wheel to enable the user to select at least one of the color for the border of the soft input panel, the color for the font used for the soft input panel, or the color for the swipe graphical element.

Paragraph AD: A computer-readable medium having computer-executable instructions thereon, the computer-executable instructions to configure a computer to perform a method as any of Paragraphs W-AC recites.

Paragraph AE: A device comprising: a computer-readable media having computer-executable instructions thereon to configure a computer to perform a method as any of Paragraphs W-AC recites, the processing unit adapted to execute the instructions to perform the method as any of Paragraphs W-AC recites.

Paragraph AF: A system comprising: one or more processors; and memory communicatively coupled to the one or more processors and storing executable instructions that, when executed by the one or more processors, cause the one or more processors to perform operations comprising: receiving an image; analyzing the image to identify a color of the image; setting the image as a background for the soft keyboard; and setting a color of a portion of the soft keyboard based at least in part on the color of the image.

Paragraph AG: A system as Paragraph AF recites, wherein the setting the image as the background for the soft keyboard comprises: applying a filter to the image to at least one of soften the image, sharpen the image, or change the color of the image; and setting the filtered image as the background for the soft keyboard.

Paragraph AH: A system as either Paragraph AF or Paragraph AG recites, wherein: the analyzing the image comprises analyzing the image to determine a most prominent color of the image; and the setting the color of the portion of the soft keyboard comprise setting the color of the portion of the soft keyboard to be a particular percentage darker or lighter than an intensity of the most prominent color of the image.

Paragraph AI: A system as any of Paragraphs AF-AH recites, wherein the portion of the soft keyboard comprises at least one of a bottom row of keys of the soft keyboard, a top row of keys of the soft keyboard, an input field portion of the soft keyboard, or characters for the soft keyboard.

Paragraph AJ: A system as any of Paragraphs AF-AI recites, wherein the operations further comprise: creating a theme based at least in part on the image that is set as the background for the soft keyboard and the color that is set for the portion of the soft keyboard; and sharing the theme with one or more devices.

Paragraph AK: A system as any of Paragraphs AF-AJ recites, wherein the operations further comprise: displaying a theme icon representing a predetermined theme, the theme icon including a background sample representing a background for the predetermined theme and a color sample representing a color to be used for the portion of the soft keyboard for the predetermined theme; receiving a selection of the theme icon; and setting a theme of the soft keyboard to the predetermined theme.

Paragraph AL: A system as any of Paragraphs AF-AK recites, wherein the operations further comprise: receiving a theme from a device, the theme defining at least a background and a color for the portion of the soft keyboard; making the theme available to another device.

Paragraph AM: A mobile device comprising: one or more processors; a display communicatively coupled to the one or more processors and configured to display a keyboard customization interface to customize a theme of a soft keyboard; and memory communicatively coupled to the one or more processors and storing executable instructions that, when executed by the one or more processors, cause the one or more processors to perform operations comprising: receiving, via the keyboard customization interface, an image; receiving, via the keyboard customization interface, user input specifying a color for a border of the soft keyboard and a color for characters of the soft keyboard; and creating a theme for the soft keyboard based at least in part on the image and the user input; wherein the display is configured to implement the soft keyboard according to the theme.

Paragraph AN: A mobile device as Paragraph AM recites, wherein the operations further comprise: identifying a most prominent color of the image; and wherein the creating the theme comprises setting a color of a portion of the soft keyboard based at least in part on the most prominent color of the image.

Paragraph AO: A mobile device as Paragraph AN recites, wherein the setting the color of the portion of the soft keyboard comprises setting the color of the portion of the soft keyboard to be a particular percentage darker or lighter than the most prominent color of the image.

Paragraph AP: A mobile device as Paragraph AN recites, wherein the portion of the soft keyboard comprises a graphical element for enabling an arc layout of the soft keyboard.

Paragraph AQ: A mobile device as any of Paragraphs AM-AP recites, wherein the border of the soft keyboard comprises at least one of a bottom row of keys of the soft keyboard, a top row of keys of the soft keyboard, or an input field portion of the soft keyboard.

Paragraph AR: A mobile device as any of Paragraphs AM-AQ recites, wherein the keyboard customization interface presents a color wheel to enable a user to select at least one of the color for the border of the soft keyboard or the color for characters of the soft keyboard.

CONCLUSION

Although the techniques have been described in language specific to structural features and/or methodological acts, it is to be understood that the appended claims are not necessarily limited to the features or acts described. Rather, the features and acts are described as example implementations of such techniques.

The techniques discussed herein can be implemented as processes with logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations can be implemented is not intended to be construed as a limitation, and any number of the operations can be executed in any order, combined in any order, subdivided into multiple sub-operations, and/or executed in parallel to implement the processes. The processes can be performed by resources associated with one or more device(s) 106, 120, and/or 200, such as one or more internal or external CPUs or GPUs, and/or one or more pieces of hardware logic such as FPGAs, DSPs, or other types of accelerators.

All of the methods and processes described herein may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
providing, by a computing device, a keyboard customization interface to customize a design of a soft input panel of a keyboard that is configured to be displayed in an arc layout;
receiving, via the keyboard customization interface, an image;
setting the image as a background of the soft input panel;
receiving, via the keyboard customization interface, first user input specifying a color for a border of the soft input panel;
setting the border of the soft input panel to the color specified in the first user input;
receiving, via the keyboard customization interface, second user input specifying a color for characters of the soft input panel;
setting the characters of the soft input panel to the color specified in the second user input;
receiving, via the keyboard customization interface, third user input specifying a color for a swipe graphical element designating a location for receiving a swipe input that causes the keyboard to transition between being displayed in a straight layout and being displayed in the arc layout, the swipe graphical element being displayed (i) at a top portion of the soft input panel when the keyboard is in the straight layout and (ii) at a bottom portion of the soft input panel when the keyboard is in the arc layout;

setting the color for the swipe graphical element to the color specified in the third user input; and causing, by the computing device, the soft input panel of the keyboard to be implemented.

2. The method of claim 1, wherein the causing the soft input panel of the keyboard to be implemented comprises displaying keys of the keyboard overlaid on the image, the keys being displayed with the characters according to the color set for the characters of the soft input panel.

3. The method of claim 1, further comprising:
applying a filter to the image to at least one of (i) soften the image, (ii) sharpen the image, (iii) change a color of the image, and (iv) change a contrast of the image.

4. The method of claim 1, further comprising:
analyzing the image;
selecting a most prominent color of the image based at least in part on the analysis; and
setting a color of a portion of the soft input panel of the keyboard based at least in part on the most prominent color of the image.

5. The method of claim 4, wherein the setting the color of the portion of the soft input panel of the keyboard comprises setting the color of the portion of the soft input panel of the keyboard to be a particular percentage darker or lighter than the most prominent color of the image.

6. The method of claim 1, wherein the border of the soft input panel comprises at least one of (i) a bottom row of keys of the keyboard, (ii) a top row of keys of the keyboard, and (iii) an input field portion of the keyboard.

7. The method of claim 1, wherein the keyboard customization interface presents a color wheel to enable the user to select at least one of (i) the color for the border of the soft input panel, (ii) the color for the characters of the soft input panel, and (iii) the color for the swipe graphical element.

8. A system comprising:
one or more processors; and
memory communicatively coupled to the one or more processors and storing executable instructions that, when executed by the one or more processors, cause the one or more processors to perform operations comprising:
receiving an image;
analyzing the image to identify a color of the image;
setting the image as a background for a soft keyboard that is configured to be displayed in (i) a straight layout or (ii) an arc layout based on a detected swipe input beginning at a location designated by a graphical element displayed in conjunction with the soft keyboard, the graphical element displayed at a top portion of the soft keyboard in the straight layout and at a bottom portion of the soft keyboard in the arc layout; and
setting a color of a portion of the soft keyboard based at least in part on the color of the image.

9. The system of claim 8, wherein the setting the image as the background for the soft keyboard comprises:
applying a filter to the image to at least one of (i) soften the image, (ii) sharpen the image, and (iii) change the color of the image; and
setting the filtered image as the background for the soft keyboard.

10. The system of claim 8, wherein:
the analyzing the image comprises analyzing the image to determine a most prominent color of the image; and
the setting the color of the portion of the soft keyboard comprises setting the color of the portion of the soft keyboard to be a particular percentage darker or lighter than an intensity of the most prominent color of the image.

11. The system of claim 8, wherein the portion of the soft keyboard comprises at least one of (i) a bottom row of keys of the soft keyboard, (ii) a top row of keys of the soft keyboard, (iii) an input field portion of the soft keyboard, and (iv) characters for the soft keyboard.

12. The system of claim 8, wherein the operations further comprise:
creating a theme based at least in part on the image that is set as the background for the soft keyboard and the color that is set for the portion of the soft keyboard; and
sharing the theme with one or more devices.

13. The system of claim 8, wherein the operations further comprise:
displaying a theme icon representing a predetermined theme, the theme icon including a background sample representing a background for the predetermined theme and a color sample representing a color to be used for the portion of the soft keyboard for the predetermined theme;
receiving a selection of the theme icon; and
setting a theme of the soft keyboard to the predetermined theme.

14. The system of claim 8, wherein the operations further comprise:
receiving a theme from a device, the theme defining at least a background and a color for the portion of the soft keyboard; and
making the theme available to another device.

15. A mobile device comprising:
one or more processors;
a display communicatively coupled to the one or more processors and configured to display a keyboard customization interface to customize a theme of a soft keyboard, the soft keyboard configured to be displayed in (i) a straight layout or (ii) an arc layout based on a detected swipe input beginning at a location designated by a graphical element displayed in conjunction with the soft keyboard, the graphical element displayed at a top portion of the soft keyboard in the straight layout and at a bottom portion of the soft keyboard in the arc layout; and
memory communicatively coupled to the one or more processors and storing executable instructions that, when executed by the one or more processors, cause the one or more processors to perform operations comprising:
receiving, via the keyboard customization interface, an image;
receiving, via the keyboard customization interface, user input specifying a color for a border of the soft keyboard and a color for characters of the soft keyboard;
creating a theme for the soft keyboard based at least in part on the image and the user input; and
causing the display to display the soft keyboard according to the theme.

16. The mobile device of claim 15, wherein the operations further comprise:
   identifying a most prominent color of the image;
   and wherein the creating the theme comprises setting a color of a portion of the soft keyboard based at least in part on the most prominent color of the image.

17. The mobile device of claim 16, wherein the setting the color of the portion of the soft keyboard comprises setting the color of the portion of the soft keyboard to be a particular percentage darker or lighter than the most prominent color of the image.

18. The mobile device of claim 16, wherein the portion of the soft keyboard comprises the graphical element for enabling the soft keyboard to be displayed in (i) the straight layout or (ii) the arc layout.

19. The mobile device of claim 15, wherein the border of the soft keyboard comprises at least one of (i) a bottom row of keys of the soft keyboard, (ii) a top row of keys of the soft keyboard, and (iii) an input field portion of the soft keyboard.

20. The mobile device of 15, wherein the keyboard customization interface presents a color wheel to enable a user to select at least one of (i) the color for the border of the soft keyboard and (ii) the color for characters of the soft keyboard.

\* \* \* \* \*